United States Patent [19]

Hamano et al.

[11] Patent Number: 4,803,901

[45] Date of Patent: Feb. 14, 1989

[54] METHOD AND SYSTEM FOR DETECTING THE ROTATION RATE OF THE OUTPUT SHAFT OF A TORQUE CONVERTER

[75] Inventors: Yukio Hamano; Seitoku Kubo; Yutaka Taga, all of Toyota, Japan

[73] Assignee: Toyota Jidosha Kabushiki Kaisha, Aichi, Japan

[21] Appl. No.: 915,651

[22] Filed: Oct. 6, 1986

[30] Foreign Application Priority Data

Oct. 7, 1985 [JP] Japan .................. 60-223356

[51] Int. Cl.$^4$ ............................................. B60K 41/22
[52] U.S. Cl. ........................................ 74/867; 74/731; 74/866; 192/103 F
[58] Field of Search .............. 74/733, 731, 732, 866, 74/867, 877; 192/103 F, 103 R, 0.076, 3.31

[56] References Cited

U.S. PATENT DOCUMENTS

| | | | |
|---|---|---|---|
| 4,313,353 | 2/1982 | Honig | 74/867 X |
| 4,331,045 | 5/1982 | Piech et al. | 74/867 |
| 4,401,200 | 8/1982 | Heidemeyer et al. | 192/103 F X |
| 4,457,411 | 7/1984 | Hiramatsu | 192/3.31 X |
| 4,475,637 | 10/1984 | Oguma et al. | 192/0.076 X |
| 4,513,638 | 4/1985 | Nishikawa et al. | 74/866 |
| 4,513,639 | 4/1985 | Hiramatsu | 74/867 X |
| 4,516,671 | 5/1985 | Nishikawa et al. | 192/0.076 |
| 4,526,065 | 7/1985 | Rosen et al. | 74/867 X |
| 4,561,328 | 12/1985 | Hiramatsu | 74/867 X |
| 4,603,604 | 8/1986 | Nishikawa et al. | 192/0.076 X |
| 4,644,826 | 2/1987 | Kubo et al. | 74/866 |
| 4,648,289 | 3/1987 | Kubo et al. | 74/866 |
| 4,653,622 | 3/1987 | Miyake | 74/866 X |
| 4,730,708 | 3/1988 | Hamano et al. | 192/103 F X |

FOREIGN PATENT DOCUMENTS

| | | |
|---|---|---|
| 47-19962 | 6/1972 | Japan . |
| 5814583 | 11/1979 | Japan . |
| 5821047 | 2/1983 | Japan . |
| 58-57550 | 4/1983 | Japan . |
| 58-128552 | 8/1983 | Japan . |
| 58-193953 | 11/1983 | Japan . |
| 59-6454 | 1/1984 | Japan . |
| 61-55455 | 3/1986 | Japan . |
| 61-278650 | 12/1986 | Japan . |
| 61-278651 | 12/1986 | Japan . |

Primary Examiner—Dirk Wright
Assistant Examiner—David Novais
Attorney, Agent, or Firm—Parkhurst, Oliff & Berridge

[57] ABSTRACT

A vehicle automatic transmission includes a torque converter which has a rotational power output member, and also includes a gear transmission mechanism. This gear transmission mechanism includes; a friction engaging mechanism; first and second rotational power input members; a first clutch which selectively engages the torque converter rotational power output member to the first rotational power input member; and a second clutch which selectively engages the torque converter rotational power output member to the second rotational power input member. When the torque converter rotational power output member is rotating the first rotational power input member via the first clutch, the gear transmission mechanism is enabled to provide its first speed stage, while, when the torque converter rotational power output member is rotating the second rotational power input member via the second clutch, the gear transmission mechanism is enabled to provide a speed stage other than its the first speed stage in cooperation with the engagement operation of the friction engaging mechanism. The rotational speed of the rotational power output member of the torque converter is detected, when the first clutch is disengaged and the second clutch is engaged, by taking it as being the rotational speed of the second rotational power input member of the gear transmission mechanism. A system is also disclosed for performing the method.

4 Claims, 6 Drawing Sheets

METHOD AND SYSTEM FOR DETECTING THE ROTATION RATE OF THE OUTPUT SHAFT OF A TORQUE CONVERTER

BACKGROUND OF THE INVENTION

The present invention relates to a method and a system for detecting the rotation rate of the output shaft of a torque converter incorporated in an automatic transmission, and more particularly relates to such a method and such as system for detecting the rotation rate of the output shaft of such a torque converter during idling operation of the transmission when anti creep action is being provided, in order to prevent the vehicle creeping forward while it is stationary, by reducing the pressure provided for actuating a forward clutch incorporated in a gear transmission mechanism comprised within the transmission.

Further, the present inventors wish hereby to attract the attention of the examining authorities to copending patent application Ser. No. 868,513 now U.S. Pat. No. 4,730,708, which may be considered to be material to the examination of the present patent application.

There is a conventional type of automatic transmission for a vehicle which comprises a fluid torque converter which receives at its power input shaft a supply of rotational power from a crank shaft or the like of an internal combustion engine and which transmits said power from its power output shaft with a certain degree of torque amplification and with a certain degree of slippage to a gear transmission mechanism which can selectively provide any one of a plurality of forward speed stages (gearing ratios) between its power input shaft thus connected to said power output shaft of said torque converter and its power output shaft connected to the driven road wheels of the vehicle so as to transmit rotational power thereto. Such a torque converter provides an amount of torque amplification and an amount of slippage between its power input shaft and its power output shaft both of which vary as the rotational speed of the input member (or pump impeller) of said torque converter varies and the load on the power output member (or turbine member) of said torque converter varies, according to determinate performance characteristics of said torque converter. And the gear transmission mechanism, which typically comprises a plurality of selectively engagable gear trains, is set in a determinate way to one or the other of said plurality of forward speed stages, according to the current values of various operational parameters of the internal combustion engine and of the vehicle incorporating it, said operatonal parameters including but not being limited to engine load (usually taken as being represented by engine throttle opening amount), vehicle road speed and the one of various shift ranges such as "D" or drive range, "S" or second range, and "L" or low range which is currently selected on a manually controlled range selection means provided to the vehicle. And the manner in which said plurality of forward speed stages is thus selected between according to the current values of said vehicle operational parameters is conventionally described by one or more shift diagrams, typically one for each one of such forward shift ranges which encompasses more than one speed stage.

When the abovementioned manual range setting means is set to "D" or drive range or some other forward driving range and the vehicle speed is substantially zero, i.e. the vehicle is substantially at rest, and further the internal combustion engine is substantially idling: the, in view of the desirability of maintaining a capability for relatively rapid starting off of the vehicle from this stopped condition, it is usually practiced not to put the gear transmission mechanism into a neutral condition in which it is incapable of transmitting rotational power between its power input shaft and its power output shaft, but instead typically said gear transmission mechanism is left as engaged to its first speed stage, i.e. its speed stage in which it provides a maximum reduction gering ratio between its power input shaft and its power output shaft. Thereby a rapid response is available when the accelerator pedal of the vehicle is pressed in order to move off from rest, and the transmission is maintained in a state ready to transmit rotational power from the engine to the wheels of the vehicle, with the torque converter providing relatively great slippage and transmitting a relatively small amount of torque at this time due to the relatively low rotational speed of its power input member which is being driven by the internal combustion engine which is idling. When the accelerator pedal is in fact thus depressed by the foot of the vehicle driver, the rotational speed of the power output member of the engine (typically its crank shaft) rises, and accordingly the rotational speed of the power input member of the torque converter rises, and thereby the torque converter is caused to transmit substantially more torque, i.e. to provide less slippage between its power input member and its power output member. This increased torque is immediately transmitted by the gear transmission mechanism, since it is being maintained as engaged to its first speed stage as explained above, to the driven road wheels of the vehicle; and thereby the vehicle is caused to move off from rest.

This leaving of the gear transmission mechanism engaged to its first speed stage during the engine idling vehicle stopped condition produces the consequence of being liable to still transmit some substantial amount of torque from the torque converter through said gear transmission mechanism to the driven road wheels of the vehicle at this time. If not counteracted, this produces so called creep of the vehicle, and indirectly leads to engine idling vibration. Further, it becomes necessary for the driver of the vehicle to press relatively hard on the brakes of the vehicle while the vehicle is thus stopped, as for example at a traffic light or the like, in order positively to prevent forward motion of the vehicle. And the drag of the torque converter on the internal combustion engine causes the fuel economy of the engine to be bad, and furthermore the transmission fluid in said torque converter tends to become hot, which can in some cases lead to an overall overheating problem for the vehicle as a whole.

This type of gear transmission mechanism typically includes a clutch which is generally called a forward clutch which is engaged when and only when the gear transmission mechanism is engaged to one of its forward speed stages, i.e. is providing for forward driving to the vehicle. This forward clutch typically comprises two sets of friction elements connected to the two members which it selectively engages together, and is typically actuated by said two sets of friction elements being pressed together by a hydraulic servo device which has a pressure chamber for its actuation. Thus, the forward clutch is engaged when hydraulic fluid pressure is supplied to said pressure chamber of said hydraulic servo device thereof, with the engagement pressure between said sets of friction elements of said clutch and accordingly its torque transmission capability increasing the greater is the pressure value of said hydraulic fluid pressure. Accordingly, it has been proposed-in Japanese Patent Applications Ser. Nos. 41-18128 (1966), 56-117742 (1981), 57-10444 (1982), 57-75829 (1982), 57-115087 (1982), and 59-176300 (1984), the first of which has been published as Japanese Patent Publication Ser. No. 47-19962 (1972), and the next listed ones of which have been respectively laid open as Japanese Patent Laid Open Publications Ser. Nos. 58-21047 (1981), 58-128552 (1983), 58-193953 (1983), and 59-6454 (1984), and 61-55455 and none of which it is intended hereby to limit as prior art to the present patent application except to the extent otherwise required by applicable law-that, in the above described condition when the engine of the vehicle is substantially in the idling condition and the vehicle speed is substantially zero, the hydraulic fluid pressure, which is thus being supplied as an actuating pressure to a frictional engaging device of the gear transmission mechanism which is of the so called forward clutch type which is engaged when and only when the gear transmission mechanism is engaged to one of its forward speed stages, sould be substantially decreased. Doing this allows said forward clutch to slip somewhat during this engine idling vehicle stopped operational condition, and desirably this actuating pressure for the forward clutch is in fact so reduced as to be just at the upper level that still ensures that the gear transmission mechanism no longer transmits toque to any substantial extent while the vehicle is stopped. This means that substantially no vehicle creep takes place, and thus there is no requirement for the driver to press on the vehicle brake in order to maintain the vehicle in the stationary state. Further, the occurrence of idling vibration is made much less likely. The fuel economy of the vehicle is also improved. Also, since there is substantially less churning up of the transmission hydraulic fluid in the fluid torque converter, the problem of heating up of said torque converter is substantially overcome. The actuating pressure for the forward clutch can be quickly raised to an appropriate operational level when the accelerator pedal of the vehicle is depressed in orderto start off the vehicle from rest, and so the provision of this anti creep device does not make the obtaining of a good response for starting off the vehicle much more difficult.

A problem that has occurred with such a system is as follows. In the above outlined construction, during the condition when the engine of the vehicle is substantially in the idling condition and the vehicle speed is substantially zero, the actuating hydraulic fluid pressure for the forward clutch is ideally reduced to a so called waiting value, which should be as high as possible short of causing said forward clutch to provide substantial torque transmission, so that said forward clutch is ready to be rapidly returned to the engaged state by moderate increase of said actuating pressure. However, this so called waiting value of actuating pressure is not defined with absolute accuracy when the transmission is being manufactured, i.e. is not always quite the same for each transmission unit of a series that are being made by mass production, and further does not always remain constant even for one transmission unit when operational conditions vary. This is because of the effect of inevitable variances from ideal specifications caused by manufacturing tolerances in, for example, the stroke of the piston of the hydraulic actuator for the forward clutch, and the strength of the return spring for said hydraulic actuator. Further, variation in the temperature of the transmission and of the hydraulic fluid filling it can cause these parameters to vary during operation, and can also cause fluctuations in the effectiveness of, for example,the sealing effectiveness of seal rings included in the hydraulic actuator. Because of all this, the ideal value of the waiting value for this forward clutch actuator hydraulic pressure at any particular time varies. Since the proposals referred to above have not been able to compensate for such variation, it has been required to set said forward clutch actuator waiting pressure to some compromise value, which typically has been on the low side, since error on the high side inevitably leads to undesirably high transmission creepage; but this has inevitably meant that in practice the desirable results obtained by the anti creep control system not setting the forward clutch waiting pressure to zero, particulary quick engagement when the vehicle is to be moved off from rest, have been largely lost.

Another problem that has arisen in this connection is that of preventing snatching of the transmission. If the forward clutch is not quickly enough engaged when anti creep action is to be terminated, then there is a risk that the torque converter revolution speed will suddenly rise up and then meet with a snatch, thus suffering an unpleasant shock. And the proper setting of the anti creep control system actually depends upon whether or not various engine ancillary devices, such as an air conditioner pump, an alternator, and the like are operating or not, as well as upon engine warming up state and other engine operational parameters.

In Japanese Patent Applications Ser. No. 60-117559 (1985) and 60-117560 (1985), which is not intended hereby to admit as prior art to the present patent application except to the extent in any case required by applicable law, the former of which is the application of which priority is claimed in U.S. Pat. application Ser. No. 868,513 now U.S. Pat. No. 4,730,708, which is copending with the present patent application, and the latter of which has been laid open as Japanese Patent Laid Open Publication Ser. No. 61-278651, there are disclosed a system and a method for idling control or anti creep control of a vehicle transmission, in which the rotational speed of the power output shaft of the fluid torque converter is detected, and in which, using real time control, the actuating hydraulic fluid pressure for the direct clutch and thus its engagement pressure are reduced, so that the rotational speed of the power output shaft of the fluid torque converter does not drop below a certain target value. Also, there is suggested the concept of detecting both the rotational speed of the power output shaft of the fluid torque converter and also the rotational speed of its power input shaft, and of so reducing the actuating hydraulic fluid pressure for the direct clutch and thus its engagement pressure, as to ensure that the difference of these rotational speeds does not drop below a certain target value. With these methods, in anti creep control in order to prevent the rotational speed of the power output shaft of the fluid torque converter from fluctuating beyond a certain acceptable limit, or alternatively in order to prevent the difference between the rotational speed of the power output shaft of the fluid torque converter and the rotational speed of its power input shaft from fluctuating beyond a certain acceptable limit, that is, in order to prevent the direct clutch from transmitting substantial torque while nevertheless keeping said direct clutch just ready to transmit substantial torque when called upon, the engagement pressure for said direct clutch is adjusted suitably while observing the rotational speed of the power output shaft of the fluid torque converter and possibly also the rotational speed of its power input shaft. Thus, it is ensured that the direct clutch does not transmit substantial torque, and also that it is held in the substantially disengaged condition with its standby engagement pressure set relatively high, so that at the end of anti creep action, when the vehicle is required to be moved away from rest, engagement of said direct clutch should be as rapid as practicable.

However, this type of method and system are fraught with the problem that it is required to detect, at least, the rotational speed of the power output shaft of the fluid torque converter. However, to perform this by mounting a rotational speed sensor directly to the output member of said fluid torque converter is not practicable from a constructional viewpoint, since the pump housing and other members of the fluid torque converter obstruct such positioning. Now this need not be a problem in the case of a transmission configured as in the case of that one illustrated in the above identified Japanese Patent Application Ser. No. 60-117559 (1985), in which an overdrive device is provided between the fluid torque converter and the main gear transmission mechanism of the transmission, i.e., in a so called "front position overdrive" type transmission, because it is possible to detect the rotational speed of the power output shaft of the fluid torque converter by detecting the rotational speed of the clutch drum which is the driven member of the overdrive clutch of the overdrive device (during the vehicle stationary engine idling operational condition the overdrive clutch is engaged, and the overdrive device is set to its directly connected operational condition, and its drive member rotates together with the carrier of its planetary pinions and with its rotational power output memer). However, in the alternative case when no such overdrive device is provided, or in the case where the main transmission mechanism is provided between an overdrive device and the fluid torque converter (a so called "rear position overdrive"), as for example in the constructions shown in Japanese Patent Publications 58-14583 (1983) and 58-57550 (1983), it has been in the prior art practically impossible to mount such a rotational speed sensor for determining the rotational speed of the power output shat of the fluid torque converter. Accordingly, in such a type of automatic transmission, the above outlined real time type of anti creep control system and method, in which the rotational speed of the power output member of the fluid torque converter is observed and the engagement pressure of the direct clutch has been adjusted accordingly, have been impraticable of being implemented, at least without making the transmission unduly large and bulky.

SUMMARY OF THE INVENTION

Accordingly, it is the primary object of the present invention to provide a method for detecting the rotational speed of the output shaft of a fluid torque converter, which avoids the problems detailed above.

It is a further object of the present invention to provide such a method for detecting the rotational speed of the output shaft of a fluid torque converter, which can be applied even to a transmission in which no overdrive device is provided.

It is a further object of the present invention to provide such a method for detecting the rotational speed of the output shaft of a fluid torque converter, which can be applied even to a transmission in which an overdrive device is provided on the other side of a main transmission mechanism thereof from said torque converter.

It is a further object of the present invention to provide such a method for detecting the rotational speed of the output shaft of a fluid torque converter, which does not entail making the construction of the transmission very much larger or bulkier than otherwise required.

It is a yet further object of the present invention to provide such a method for detecting the rotational speed of the output shaft of a fluid torque converter, which can function accurately and effectively to provide proper anti creep action even when operational conditions change.

It is a yet further object of the present invention to provide such a method for detecting the rotational speed of the output shaft of a fluid torque converter for an automatic transmission, which allows anti creep action to be provided which keeps engine fuel economy high and which helps to prevent engine overheating, engine idling vibration, and engine snatch.

It is a concomitant further object of the present invention to provide a system which implements such methods, so as to achieve at least some of the objects detailed above.

According to the most general method aspect of the present invention, these and other objects are attained by, for an automatic transmission comprising a torque converter which comprises a rotational power output member, and a gear transmission mechanism which comprises: a friction engaging mechanism; a first rotational power input member; a first clutch which selectively engages said torque converter rotational power output member and said first rotational power input member; a second rotational power input member; and a second clutch which selectively engages said torque converter rotational power output member and said second rotational power input member; and such that: when said torque converter rotational power output member is rotating said first rotational power input member via said first clutch, said gear transmission mechanism is enabled to provide its first speed stage; while when said torque converter rotational power output member is rotating said second rotational power input member via said second clutch, said gear transmission mechanism is enabled to provide a speed stage other than its said first speed stage in cooperation with the engagement operation of said friction engaging mechanism: a method for detecting the rotational speed of said rotational power output member of said torque converter, wherein, when said first clutch is disengaged and said second clutch is engaged, said rotational speed is taken as being the rotational speed of said second rotational power input member of said gear transmission mechanism; and, according to the most general system aspect of the present invention, these and other objects are attained by, for an automatic transmission comprising a torque converter which comprises a rotational power output member, and a gear transmission mechanism which comprises: a friction engaging mechanism; a first rotational power input member; a first clutch which selectively engages said torque converter rotational power output member and said first rotational power input member; a second rotational power input member; and a second clutch which selectively engages said torque converter rotational power output member and said second rotational power input member; and such that: when said torque converter rotational power output member is rotating said first rotational power input member via said first clutch, said gear transmission mechanism is enabled to provide its first speed stage; while when said torque converter rotational power output member is rotating said second rotational power input member via said second clutch, said gear transmission mechanism is enabled to provide a speed stage other than its said first speed stage in cooperation with the engagement operation of said friction engaging mechanism: a system for detecting the rotational speed of said rotational power output member of said torque converter when said first clutch is disengaged and said second clutch is engaged, comprising a rotational speed sensor mounted to said second rotational power input member of said gear transmission mechanism so as to sense its rotational speed.

In general, gear transmission mechanisms as applied to automatic transmissions fall into two classes: Simpson type and Labineau type. Both of these are planetary gear type devices, and each comprises at least two input members. When torque is applied to one of said input members, the gear transmission mechanism provides its first speed stage; while, when torque is applied to the other of said input members, the gear transmission mechanism provides a higher speed stage than its said first speed stage, in cooperation with the engagement of a friction engagement device for performing anti creep control. At this time, in the terms of the summary of the present invention laid out in the previous paragraph to this one, the first clutch is disengaged, while the second clutch is engaged so as to rotate the second rotational power input member. Thus, according to the concept of the present invention, at this time the rotational speed of this second rotational power input member or of a member rotating together therewith is monitored, and this is taken as the rotational speed of the rotational power output member of the fluid torque converter, which itself as explained above is a member which is in many tranmission configurations very inaccessible and difficult of having its rotational speed directly measured. Accordingly, according to the present invention, it is seen that there are provided a method and device for detecting the rotational speed of the output shaft of a fluid torque converter, which can be applied even to a transmission in which no overdrive device is provided, or to a transmission in which an overdrive device is provided on the other side of a main transmission mechanism thereof from said torque converter. And this method for detecting the rotational speed of the output shaft of a fluid torque converter does not entail making the construction of the transmission very much larger or bulkier than otherwise required, and allows anti creep action to be conveniently provided, thus to keep engine fuel economy high and to prevent engine overheating, engine idling vibration, and engine snatch.

BRIEF DESCRIPTION OF THE DRAWINGS

The present invention will now be described with respect to the preferred embodiments thereof, and with reference to the illustrative drawings appended hereto, which however are provided for the purposes of explanation and exemplification only, and are not intended to be limitative of the scope of the present invention in any way, since this scope is to be delimited solely by the accompanying claims. With relation to the figures, spatial terms are to be understood as referring only to the orientation on the drawing paper of the illustrations of the relevant parts, unless otherwise specified; like reference numerals, unless otherwise so specified, denote the same parts and gaps and spaces and so on in the various figures relating to one preferred embodiment, and like parts and gaps and spaces and so on in the figures relating to different preferred embodiments; and:

DESCRIPTION OF THE PREFERRED EMBODIMENTS

The present invention will now be described with reference to the preferred embodiments thereof, and with reference to the figures.

Overall Transmission Structure for the First Set of Preferred Embodiments

Figure 1:
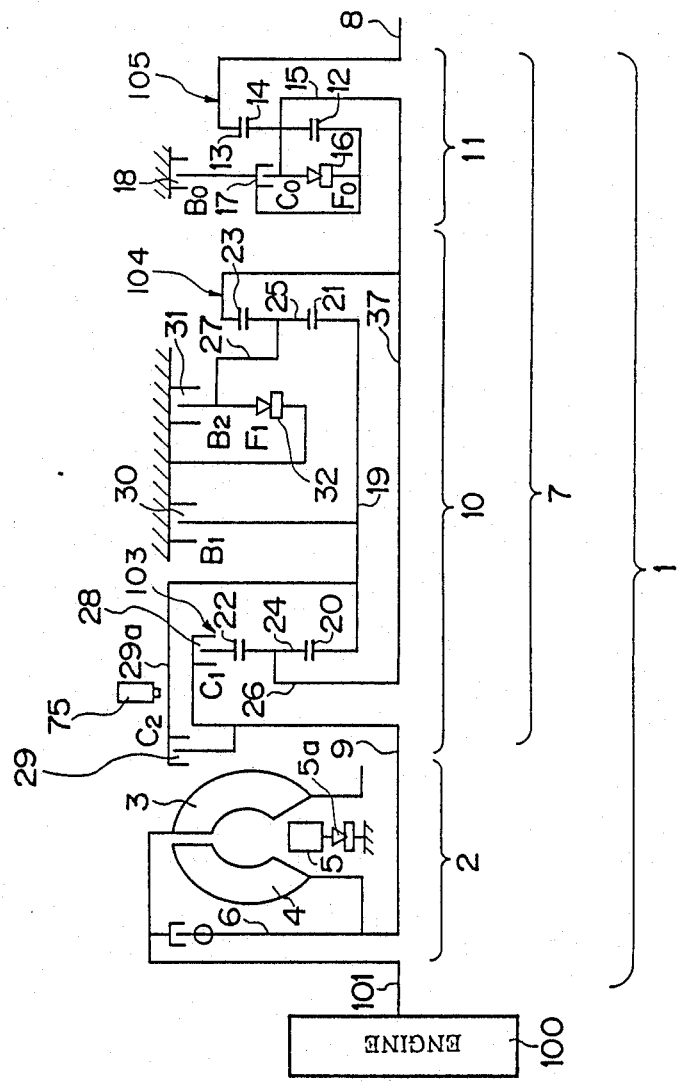
FIG. 1 is a schematic skeleton diagram showing the overall layout of the components of an automatic transmission to which first through the third anti creep control systems and corresponding preferred embodiments of the torque converter output shaft rotation rate detection system and method of the present invention are applied.

FIG. 1 is a schematic skeleton diagram showing the overall layout of the components of an automatic transmission, denoted by the reference numeral 1, to which the first set of preferred embodiments of the torque converter output shaft rotation rate detection system and method of the present invention are exemplarily applied. In this figure, the automatic transmission 1 is shown as being powered by an internal combustion engine 100 via a shaft 101 which may be a continuation of the crank shaft of said engine 100, and as transmitting output rotational power to shaft 8 which leads, although this is not particularly indicated in the figures, to a differential device for powering the driven wheels of the automotive vehicle to which this automatic transmission 1 and this internal combustion engine 100 are fitted.

In more detail, the automatic transmission 1 comprises a fluid torque converter assembly 2 and a gear transmission mechanism 7. The fluid torque converter assembly 2 is supplied with rotational power via the aforementioned power output shaft 101 of the internal combustion engine 100, which thus functions as a power input shaft for said fluid torque converter assembly 2; and a shaft 9 functions as a power output shaft for said fluid torque converter assembly 2 and also as a power input shaft for the gear transmission mechanism 7 and transmits rotational power therebetween.

The fluid torque converter assembly 2 is of a per se conventional three element single stage two phase type with a direct clutch, and comprises a pump impeller 3 rotationally connected to the power output shaft 101 of the internal combustion engine 1, a turbine member 4 rotationally connected to the power output shaft 9 for said torque converter assembly 2, and a stator member 5 mounted via a one way clutch 5a to the casing of said fluid torque converter assembly 2. In a per se known transmission having fluid in the general circulation pattern of a smoke ring around the toroidal shape defined by the pump impeller 3, the turbine member 4, and the stator member 5, torque is transmitted from the pump impeller 3 to the turbine member 4 and thereby from the power input shaft 101 of the fluid torque converter assembly 2 to the power output shaft 9 thereof with a certain amount of slippage and also of torque amplification being provided therebetween, the amount of such slippage and torque amplification being determined by the rotational speed of the power input shaft 101 of the torque converter assembly 2 and also by the output load on its power output shaft 9. A lock up clutch 6 of a per se known sort is provided for, when optionally engaged by the supply of actuating hydraulic pressure thereto from a control system therefor, directly connecting the power input shaft 101 to the power output shaft 9, thus bypassing the above described hydraulic connection for the torque converter assembly and eliminating said slippage and torque amplification between said input and output shaft provided thereby.

In further detail, the gear transmission mechanism 7 comprises a main gear transmission mechanism 10 and an auxiliary gear transmission mechanism 11. The main gear transmission mechanism 10 is supplied with rotational power via the aforementioned power output shaft 9 of the fluid torque converter assembly 2, which thus functions as a power input shaft for said main gear transmission mechanism 10; and a shaft 37 functions as a power output shaft for said main gear transmission mechanism 10 and also as a power input shaft for the auxiliary gear transmission mechanism 11 and transmits rotational power therebetween.

First, the main gear transmission mechanism 10 will be explained. This mechanism 10 comprises first and second planetary gear mechanisms 103 and 104 which are arranged on the outside of a hollow intermediate shaft 19 which is coaxially fitted over the aforementioned power output shaft 37 of the main gear transmission mechanism 10. The first planetary gear mechanism 103 comprises a sun gear 20, a coaxially provided ring gear 22, and a carrier 26 which rotatably supports a plurality of planetary pinions 24 which are meshed with outer teeth formed on the sun gear 20 and with inner teeth formed on the ring gear 22 and which perform planetary motion between said sun gear 20 and said ring gear 22 in a per se conventional manner. The sun gear 20 is fixed upon the left end in the figure of the intermediate shaft 19, and the carrier 26 for the planetary pinions 24 is rotationally connected to the power output shaft 37 of this main gear transmission mechanism 10. A clutch C1 28 is provided for selectively, when operated as will be particularly described later by selective and appropriate supply of actuating hydraulic fluid pressure thereto, rotationally connecting said ring gear 22, which constitutes one rotational power input member for this main gear transmission mechanism 10, to the power input shaft 9 with respect to mutual rotation therebetween in both rotational directions. And a clutch C2 29 is provided for selectively, when operated by selective supply of actuating hydraulic fluid pressure thereto, rotationally connecting said power input shaft 9 to the sun gear 20 and to the aforementioned intermediate shaft 19, which constitutes another rotational power input member for this main gear transmission mechanism 10, again with respect to mutual rotation therebetween in both rotational directions. The clutch C1, which as will be seen later functions as a forward clutch, is not particularly detailed with regard to its structure in FIG. 1, but can be of a per se conventional type as will be described later in detail; in any case, this clutch C1 is engaged when hydraulic fluid pressure is supplied to its actuating pressure chamber (not particularly shown in FIG. 1), while it is disengaged when no hydraulic fluid pressure is supplied to its said pressure chamber. Further, the clutch C2, which functions as a direct clutch, is a per se conventional type of friction engaging mechanism comprising a per se conventional hydraulic actuator system, and like the clutch C1 is engaged when hydraulic fluid pressure is supplied to its actuating pressure chamber (not particularly shown), while it is disengaged when no hydraulic fluid pressure is supplied to its said pressure chamber. The second planetary gear mechanism 104 comprises a sun geaar 21, a coaxially provided ring gear 23, and a carrier 27 which rotatably supports a plurality of planetary pinions 25 which are meshed with outer teeth formed on the sun gear 21 and with inner teeth formed on the ring gear 23 and perform planetary motion between said sun gear 21 and said ring gear 23 in a per se conventional manner. The sun gear 21 is fixed on the right end in the figure of the aforementioned intermediate shaft 19, and the ring gear 23 is rotationally connected to the power output shaft 37 of this main gear transmission mechanism 10. A brake B1 30 is provided for selectively, when operated by selective supply of actuating hydraulic fluid pressure thereto, rotationally connecting the aforementioned intermediate shaft 19 to the casing of this main gear transmission mechanism 10 with respect to mutual rotation therebetween in both rotational directions. And a brake B2 31 is provided for selectively, when operated by selective supply of actuating hydraulic fluid pressure thereto, rotationally connecting the carrier 27 for the planetary pinions 25 to said casing of this main gear transmission mechanism 10 with respect to mutual rotation therebetween in both rotational directions. Also, a one way clutch F1 is provided for always rotationally connecting said carrier 27 for said planetary pinions 25 to said casing of this main gear transmission mechanism 10 with respect to mutual rotation therebetween in one rotational direction only. The brakes B1 and B2 again are per se conventional types of friction engaging mechanisms comprising per se conventional hydraulic actuator systems, and like the brake B0 are engaged when hydraulic fluid pressure is supplied to their pressure chambers (not particularly shown), while they are disengaged when no hydraulic fluid pressure is supplied to their said pressure chambers. And, particularly according to the concept of the present invention as will be explained hereinafter, a rotational speed sensor 75 is provided for detecting the current value of the rotational speed of the clutch drum 29a of the direct clutch C2 29, i.e. of the driven member of the clutch 29, which is integrally connected with and rotates along with the intermediate shaft 19.

Thus, by selective engagement and disengagement of the clutches C1 and C2 and of the brakes B1 and B2, the main gear transmission mechanism 10 can be controlled to provide any one of three forward gearing ratios or rotational speed stages and one reverse gearing ratio or rotational speed stage between its power input shaft 9 and its power output shaft 37, in a manner which will be clear to one of ordinary skill in the relevant art based upon the above explanations.

Next, the auxiliary gear transmission mechanism 11 will be explained. This mechanism 11 comprises a third planetary gear mchanism 105 which comprises a sun gear 12, a coaxially provided ring gear 13, and a carrier 15 which rotatably supports a plurality of planetary pinions 14 which are meshed with outer teeth formed on the sun gear 12 and with inner teeth formed on the ring gear 13 and which perform planetary motion between said sun gear 12 and said ring gear 13 in a per se conventional manner. The carrier 15 of the planetary pinions 14 is rotationally connected to the power output shaft 37 of the main gear transmission mechanism 10, which also functions as a power input shaft for this auxiliary gear transmission mechanism 11, so as to receive rotational power therefrom, and the ring gear 13 is rotationally connected to the power output shaft 8 of the gear transmission mechanism as a whole, so as to output rotational power therefrom to the driven wheels of the vehicle. A one way clutch F0 16 is provided for always rotationally connecting the carrier 15 to the sun gear 12 with respect to mutual rotation therebetween in one rotational direction only; a clutch C0 17 is provided for selectively, when operated by selective supply of actuating hydraulic fluid pressure thereto, rotationally connecting the carrier 15 to the sun gear 12 with respect to mutual rotational therebetween in both rotational directions; and a brake B0 18 is provided for selectively, when operated by selective supply of actuating hydraulic fluid pressure thereto, rotationally connecting the sun gear 12 to the casing of the auxiliary gear transmission mechanism 11 with regard to mutual rotation therebetween in both rotational directions. The clutch C0 and the brake B0 are both per se conventional types of friction engaging mechanisms comprising per se conventional hydraulic actuator systems, and are engaged when hydraulic fluid pressure is supplied to their pressure chambers (not particularly shown), while they are disengaged when no hydraulic fluid pressure is supplied to their said pressure chambers. Thus, by selective engagement and disengagement of the clutch C0 and the brake B0, the auxiliary gear transmission mechanism 11 can be controlled to provide either of two gearing ratios or rotational speed stages, i.e. a directly connected speed stage and a speed increasing speed stage, between its power input shaft 37 and its power output shaft 8, in a manner which will be clear to one of ordinary skill in the relevant art based upon the above explanations.

And, further, the gear transmission mechanism 7 as a whole, as a combination of the auxiliary gear transmission mechanism 11 and the main gear transmission mechanism 10 and by the combined operation thereof, according to selective engagement and disengagement of the clutches C0, C1, and C2 and of the brakes B0, B1 and B2, can be controlled to provide any one of five forward gearing ratios or rotational speed stages including an overdrive speed stage and one reverse gearing ratio or rotational speed stage between its power input shaft 9 and its power output shaft 8, as particularly detailed in Table 1 which for convenience of pagination is given at the end of the specification and before the claims of the present patent application. In this Table 1, an "O" in a column relating to a hydraulic clutch or a hydraulic brake indicates that said hydraulic clutch or hydraulic brake is engaged, while an "X" relating to such a hydraulic clutch or hydraulic brake indicates that said hydraulic clutch or hydraulic brake is disengaged; and an "O" in a column relating to a one way clutch indicates that said one way clutch is engaged so as to transmit rotational power when the internal combustion engine 100 is powering the driven wheels (not particularly shown) of the vehicle via the automatic transmission system 1 and on the other hand is free wheeling or disengaged when said engine 100 is not so driving said driven wheels of the vehicle, in other words indicates that said clutch is free wheeling in, and only in, the engine overrun condition; while an "F" relating to a one way clutch indicates that said one way clutch is free wheeling or disengaged. From this Table 1, it will be understood that: when the automatic transmission 1 is being operated in the drive or "D" range, all five of its forward speed stages including its overdrive speed stage are available to be utilized, according to vehicle operational conditions; but, however, when the automatic transmission 1 is being operated in the second or "S" range, no upshift from the third speed stage to the fourth or the fifth speed stage is ever performed, and only the first through the third speed stages are available to be utilized; and further, when the automatic transmission 1 is being operated in the low or "L" range, no upshift from the second speed stage to the third, the fourth, or the fifth speed stage is ever performed, and only the first and the second speed stages are available to be utilized. And further it will be particularly noted from this Table 1 that the hydraulic clutch C1 is engaged when, and only when, the gear transmission mechanism 7 is engaged to a forward speed stage (i.e., to the first, second, third, fourth, or fifth speed stage), and is otherwise disengaged.

In general, each of the various hydraulic clutches and brakes detailed above, i.e. the clutches C0, C1, and C2 and the brakes B0, B1, and B2, is selectively engaged and disengaged by its hydraulic actuator system, by selective supply of hydraulic fluid pressure thereto from a control system which is an embodiment of the present invention, according to the current values of various operational parameters of the vehicle to which this automatic transmission 1 is fitted, such as vehicle road speed, engine load, range set by the vehicle driver on a manual range setting valve, and so on. Further, when said manual range setting valve is set by the driver to a forward driving range such as "D" range, "S" range, or "L" range, and then the driver releases the accelerator pedal of the vehicle so as to reduce throttle opening to substantially zero, then as the vehicle road speed drops the aforesaid control system shifts the gear transmission mechanism 7 down through its speed stages, and below a certain road speed said gear transmission mechanism 7 is set to its first speed stage, in any one of the aforementioned forward driving ranges. An anti creep method and system for this transmission, which cooperate with the output shaft rotation rate detection method and system according to the present invention which will shortly be described, are partially characterized by operating so that, when the manual shift range of the transmission is set to a forward driving range, the vehicle is substantially stationary, and the engine thereof is substantially in the idling condition, the engagement pressure for the forward clutch C1 28 is reduced, so that said forward clutch C1 28 slips somewhat; thereby, anti creep action for the vehicle is provided.

The First Preferred Embodiments

Figure 2:
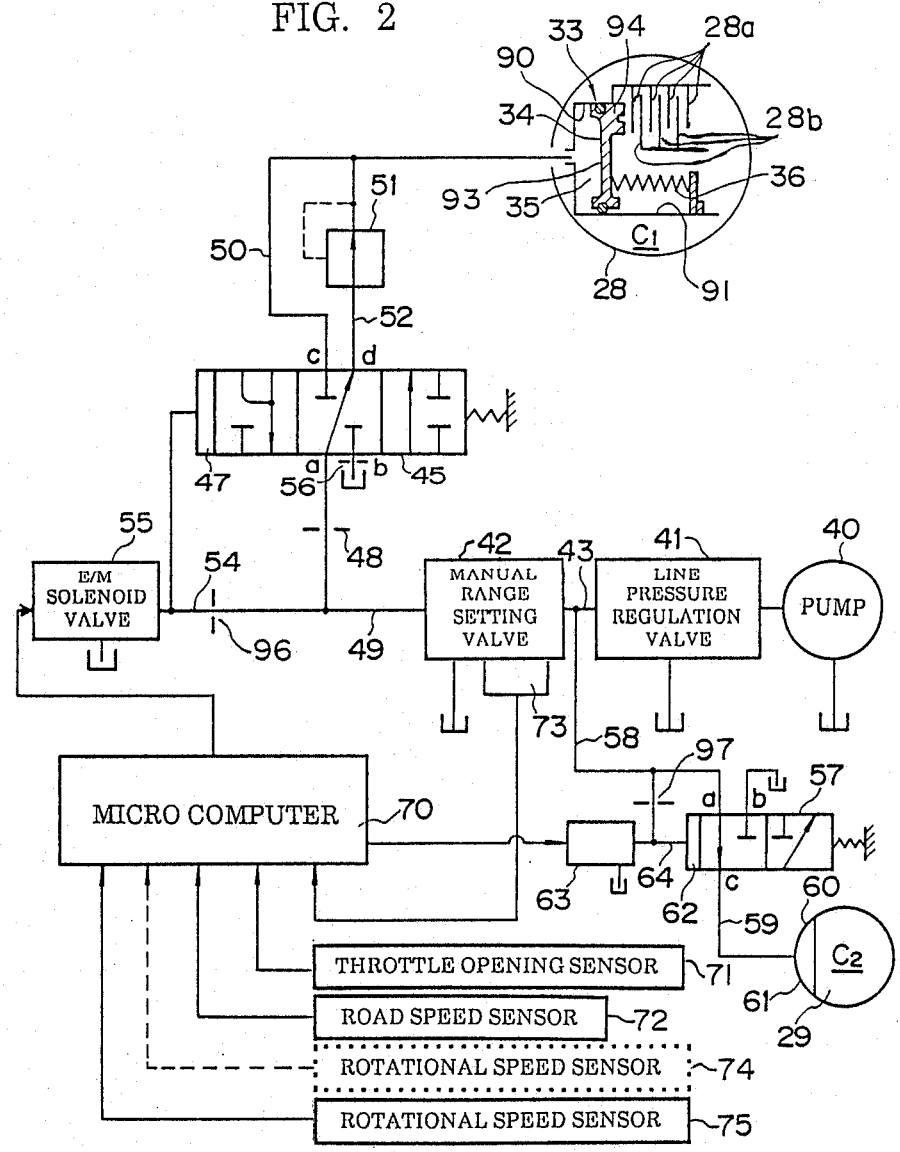
FIG. 2 is a schematic block diagram showing relevant parts of said first through third anti creep control systems, as applied to the FIG. 1 transmission, and also shows a partial longitudinal sectional view through a forward clutch of said FIG. 1 transmission.

Preferred embodiments of the method and system of the present invention for torque converter output shaft rotational speed determination will now be described with respect to first through third anti creep control systems and methods, all of which are of the hybrid hydraulic/electronic type incorporating a microprocessor. In FIG. 2, a schematic block diagram of relevant parts of said anti creep control systems is shown; this figure applies to all three anti creep control systems which will be disclosed, and also shows a partial axial sectional view taken through a relevant version of the previously mentioned forward clutch C1 28 of the gear transmission 7 of the transmission 1 to which this first anti creep control system is provided.

In detail, the forward clutch C1 of the main gear transmission mechanism 10 of the gear transmission mechanism 7 to which this first anti creep control system is provided is per se conventional, having two sets 28a and 28b of annular clutch plates which are alternately superposed in a sandwiched arrangement, i.e. are mutually interleaved, and the outer peripheries of the one set 28a of these clutch plates are rotationally secured to one of the shaft 9 and the ring gear 22 which this forward clutch 28 selectively rotationally couples together (see FIG. 1), while the inner peripheries of the other set 28b of these clutch plates are secured to the other one of said shaft 9 and said ring gear 22. The hydraulic actuator system 33 for this forward clutch C1 28 comprises an annular piston member 34 which can slide to and fro in the left and right directions as seen in FIG. 2 in an annular cylindrical bore which has an inner cylindrical bore 91 and an outer cylindrical bore 90 and which is defined in a member rotationally coupled to (and typically integrally formed with) one of the shaft 9 and the ring gear 22. It should be understood that only a partial sectional view showing one side of the clutch plates 28a and 28b, the piston member 34, the bores 91 and 90, and so on, is shown in FIG. 2, and in fact the forward clutch C1 28 and its actuator system are generally annular and circularly symmetrical.

The annular piston member 34, in more detail, is generally formed as a flat annulus and extends between the inner cylindrical bore 91 and the outer cylindrical bore 90 and has an annular surface 93 defined on its left side in the figure, and the right hand (in the figure) annular end of a raised annulus 94 formed on its right side surface presses against the superposed sandwich of the sets of clutch plates 28a and 28b. Annular seal members are fitted between the outer periphery of the annular piston member 34 and the outer cylindrical bore 90, and between the inner periphery of said annular piston member 34 and the inner cylindrical bore 91, and thereby a pressure chamber 35 is defined on the left side in the figure of the piston member 34, with the effective pressure receiving area within this pressure chamber 35 of the piston member 34 being the aforementioned area of the annular surface 93. Further, an annular spring 36 is provided for biasing the annular piston member 34 in the leftwards direction in the figure, i.e. in the direction to release its pressing upon the superposed sandwich of the clutch plates 28a and 28b and to reduce the volume of the pressure chamber 35. Further, a conduit means to be described shortly is provided for selectively supplying hydraulic fluid pressure to this pressure chamber 35, or alternatively for draining said chamber 35.

Accordingly, when no hydraulic fluid pressure is supplied to the pressure chamber 35 of this hydraulic actuator system 33, and this chamber 35 is instead drained, then by the biasing action of the annular spring 36 the piston member 34 is moved to the left in the figure, and thereby the superposed sandwich of the clutch plates 28a and 28b is not substantially compressed together at all, and the clutch plates 28a and the clutch plates 28b are not rotationally mutually substantially coupled together, and accordingly no substantial rotational torque can be transmitted from the shaft 9 to the ring gear 22 of the main gear transmission mechanism 10. Further, when hydraulic fluid pressure of a relatively low pressure level is supplied to the pressure chamber 35 of the hydraulic actuaator system 33, then the action of this hydraulic fluid pressure urges the piston member 34 in the rightward direction in the figure with a relatively moderate force, against only the opposition of the annular biasing action of the spring 36 which is not very considerable in this context, and thereby the superposed sandwich of the clutch plates 28a and 28b is fairly moderately compressed together, and the clutch plates 28a and the clutch plates 28b are rotationally fairly moderately mutually coupled together, and accordingly rotational torque can be transmitted from the shaft 9 to the ring gear 22 of the main gear transmission mechanism 10 with a fairly moderate coupling action; in other words, only a relatively moderate torque can be satisfactorily transmitted. On the other hand, when hydraulic fluid pressure of a relatively high pressure level is supplied to said pressure chamber 35 of said hydraulic actuator system 33, then the action of this pressure urges the piston member 34 in the rightward direction in the figure with a relatively strong force, and thereby the superposed sandwich of the clutch plates 28a and 28b is relatively strongly compressed together, and the clutch plates 28a and the clutch plates 28b are rotationally relatively strongly mutually coupled together, and accordingly rotational torque can be transmitted from the shaft 9 to the ring gear 22 of the main gear transmission mechanism 10 with a relatively strong coupling action; in other words, a relatively large torque can be satisfactorily transmitted.

Now, the arrangements for supplying controlling hydraulic fluid pressure to the pressure chamber 34 of the hydraulic actuator system 33 for this clutch C1 28 will be detailed. A hydraulic fluid pump 40 picks up hydraulic fluid from a sump (not shown in detail) and supplies it under pressure via a conduit to a line pressure regulation valve 41, which relatively bleeds off some of said pressurized hydraulic fluid back to the sump so as to produce a line pressure at its output side which is regulated to a substantially constant value; so far, these elements described are per se conventional. This line pressure is supplied via a conduit 43 to the input port of a manual range setting valve 42, which also is per se conventional: this manual range setting valve 42 typically comprises a valve element (not particularly shown) which is manually settable by the driver of the vehicle, via a linkage or the like, to any one of the aforementioned various speed ranges, i.e. "D" or drive range, "S" or second range, "L" or low range, "R" or reverse range, "N" or neutral range, and "P" or parking range. This manual range setting valve 42 has various output ports, which are connected in various combinations to its said input port so as to receive supply of line pressure therefrom when the valve element of said manual range setting valve 42 is positioned to its various positions corresponding to these various ranges; most of these output ports are not relevant to the present discussion, but one of them, which is communicated to said input port of said manual range setting valve 42 when and only when the driver of the vehicle has selected a forward driving range thereon, i.e. has selected "D" or drive range, "S" or second range, or "L" or low range, is communicated via a conduit 49 and via a throttling element 48 located intermediately therein to a port designated as "a" of a forward clutch control valve 45. Also, this output port of the manual range setting valve 42 is communicated, via another throttling element 96, with an intermediate point of another hydraulic conduit 54.

The forward clutch control valve 45 has four ports, designated as "a", "b", "c", and "d". The port "a" is communicated to the manual range setting valve 42 as already described; thereby, when the manual range setting valve 42 is set to any one of "D" or drive range, "S" or second range, or "L" or low range, line pressure is supplied to said port "a" with a certain flow resistance determined by the throttling element 48 interposed to said supply. The port "b" of the forward clutch control valve 45 is communicated to drain via a throttling element 56. the port "c" of the forward clutch control valve 45 is communicated directly, via a hydraulic conduit 50, to the pressure chamber 35 of the hydraulic actuator system 33 for the forward clutch C1 28. And the port "d" of the forward clutch control valve 45 is communicated, via another hydraulic conduit 52 and a pressure reduction valve 51, likewise to said pressure chamber 35 of said hydraulic actuator system 33 for said forward clutch C1 28.

This forward clutch control valve 45 is a hydraulic switching valve which comprises a vale element (not particularly shown) which reciprocates in a bore and is urged to the right in the figure by supply of hydraulic fluid pressure to a pressure chamber 47, only schematically shown, provided at the left end in the figure of said forward clutch control valve 45, while said valve element is urged to the left in the figure by the biasing action of a spring, only schematically shown. And the forward clutch control valve 45 functions as follows. When the pressure chamber 47 is supplied with a hydraulic fluid presure less than a first determinate pressure value, then as schematically indicated in the figure the aforementioned valve element of said forward clutch control valve 45 is positioned by the action of said spring to a first position in which its input port "a" is connected to its port "c", while its ports "b" and "d" are isolated and are connected to no other ports. When, on the other hand, said pressure chamber 47 is supplied with a hydraulic fluid pressure greater than said first determinate pressue value and less than a second determinte pressure value then also as schematically indicated in the figure the aforementioned valve element of said forward clutch control valve 45 is positioned by the action of said pressure in said chamber 47 fighting against the action of said spring to a second positio in which its input port "a" is connected to its port "d", while its ports "b" and "c" are isolated and are connected to no other ports. And, when said pressure chamber 47 is supplied with a hydraulic fluid pressure greater than said second determinate pressure value, then as also schematically indicated in the figure the aforementioned valve element of said forward clutch control valve 45 is positioned by the action of said pressure which overcomes the action of said spring to a third position in which its input port "a" is isolated and is not connected to any other ports, while its ports "c" and "d" are both together connected to its port "b".

Thus, assuming that the driver of the vehicle has positioned the manual range setting valve 42 to a forward driving range as explained above, so that suply of the line pressure is being provided from said valve 42 to the conduit 49 and thence to the port "a" of the forward clutch control valve 45: if the pressure chamber 47 of said forward clutch control valve 45 is being supplied with a hydraulic fluid pressure less than said first determinate pressure value, then the port "c" of said valve 45 is provided with line pressure while its ports "b" and "d" are isolated and are connected to no other ports, and accordingly substantially full line pressure is supplied to the pressure chamber 35 of the hydraulic actuator system 33 for the forward clutch C1 28, via the conduit 50, without substantial attenuation. Thereby said forward clutch 28 is fully engaged and is able to transmit maximum torque between the shaft 9 and the ring gear 22 of the main gear transmission mechanism 10, i.e. from the fluid torque converter assembly 2 to the intermediate shaft 37 which leads to the auxiliary gear transmission mechanism 11, without substantial slippage. When, however, the pressure chamber 47 of said forward clutch control valve is being supplied with a hydraulic fluid pressure greater than said first determinate pressure value but less than said second determinate pressure value, then the port "d" of said valve 45 is provided with line pressure while its ports "b" and "c" are isolated and are connected to no other ports, and accordingly line pressure is supplied to the pressure chamber 35 of the hydraulic actuator system 33 for the forward clutch C1 28, via the conduit 52, but receiving substantial attenuation from the pressure reduction valve 51. The preset setting of this pressure reduction valve 51 is so determined that the forward clutch C1 28 is, at this time, maintained in its condition as slipping just short of transmitting substantial torque between the shaft 9 and the ring gear 22 of the main gear transmission mechanism 10; in other words, so as to not quite allow the vehicle to creep substantially forward. And, when on the other hand the pressure chamber 47 of the forward clutch control valve 45 is being supplied with a hydraulic fluid pressure greater than said second determinate pressure value, then the ports "c" and "d" of said valve 45 are both drained via the port "b" thereof, and accordingly no substantial pressure at all is supplied to the pressure chamber 35 of the hydraulic actuator system 33 for the forward clutch C1 28, and therefore said forward clutch C1 28 is allowed to slip completely, and is substantially completely disengaged and does not transmit any substantial torque between the shaft 9 and the ring gear 22 of the main gear transmission mechanism 10.

The pressure chamber 47 of the forward clutch control valve 45 is supplied with actuating hydraulic fluid pressure via the aforementioned conduit 54 from a port of an electromagnetic solenoid valve 55. This valve 55 is of a per se known type, and comprises a solenoid (not particularly shown) which is supplied with a pulsed electrical signal which has a duty ratio, from an electrical control system which will be described hereinafter. And, as mentioned earlier, the conduit 54 is also supplied via the throttling element 96 with line pressure from the manual range setting valve 42. The elecgtromagnetic solenoid valve 55 is so constituted that: when said electromagnetic solenoid valve 55 is supplied with a pulse signal of a first determinate duty ratio value, it connects the conduit 54 to drain substantially always, so that the pressure supplied to the pressure chamber 47 of the forward clutch control valve 45 is very low or zero, and is certainly less than said first determinate pressure value; when said electromagnetic solenoid valve 55 is supplied with a pulse signal of a second determinate duty ratio value, it connects the conduit 54 to drain only intermittently, so that the pressure supplied to the pressure chamber 47 of the forward clutch control valve 45 is of an intermediate pressure value, greater than said first determinate pressure value but less than said second determinate pressure value; and, when said electromagnetic solenoid valve 55 is supplied with a pulse signal of a third determinate duty ratio value, it does not connect the conduit 54 to drain at all, so that the pressure supplied to the pressure chamber 47 of the forward clutch conrol valve 45 is substantially line pressure, i.e. is greater than said second determinate pressure value.

Accordingly, again assuming that the driver of the vehicle has positioned the manual range setting valve 42 to a forward driving range such as "D" range, "S" range, or "L" range as explained above, if the duty ratio of the pulse signal supplied to the electromagnetic solenoid valve 55 is equal to the aforementioned first determinate duty ratio value, then substantially full line pressure is supplied to the pressure chamber 35 of the hydraulic actuator system 33 for the forward clutch C1 28, via the conduit 50, without substantial attenuation, and thereby said forward clutch 28 is fully engaged and is able to transmit maximum torque between the shaft 9 and the ring gear 22 of the main gear transmission mechanism 10, i.e. from the fluid torque converter assembly 2 through the main gear transmission mechanism 10 and then through the auxiliary gear transmission mechanism 11 to the output shaft 8 of the transmission, without substantial slippage. When, however, the duty ratio of the pulse signal supplied to the electromagnetic solenoid valve 55 is equal to the aforementioned second determinate duty ratio value, then line pressure is supplied to the pressure chamber 35 of the hydraulic actuator system 33 for the forward clutch C1 28, via the conduit 52, but receiving substantial attenuaton from the pressure reduction valve 51, and thereby as explained above the forward clutch C1 28 is, at this time, maintained in its condition as slipping just short of transmitting substantial torque between the shaft 9 and the ring gear 22 of the main gear transmission mechanism 10; in other words, so as to not quite allow the vehicle to creep substantially forward. And, when on the other hand the duty ratio of the pulse signal supplied to the electromagnetic solenoid valve 55 is equal to the aforementioned third determinate duty ratio value, accordingly no substantial pressure at all is supplied to the pressure chamber 35 of the hydraulic actuator system 33 for the forward clutch C1 28, and therefore said forward clutch C1 28 is allowed to slip completely, and is substantially completely disengaged and does not transmit any substantial torque between the shaft 9 and the ring gear 22 of the main gear transmission mechanism 10.

Further, the control system for the transmission 1 includes a shift valve 57 for switching between the second speed stage and the third speed stage. This 2–3 shift valve 57, similarly to the forward clutch control valve 45, is a per se known type of hydraulic switching valve which comprises a valve element (not particularly shown) which reciprocates in a bore and is urged to the right in the figure by supply of hydraulic fluid pressure to a pressure chamber 62, only schematically shown, provided at the left end in the figure of said 2–3 shift valve 57, while said valve element is urged to the left in the figure by the biasing action of a spring, only schematically shown. And the 2–3 shift valve 57 functions as follows. When the pressure chamber 62 is supplied with a hydraulic fluid pressure less than a certain determinate pressure value, then as schematically indicated in the figure the aforementioned valve element of said 2–3 shift valve 57 is positioned by the action of said spring to a first position in which its ports "b" is connected to its port "c", while its input port "a" is isolated and is connected to no other port. When, on the other hand, said pressure chamber 62 is supplied with a hydraulic fluid pressure greater than said certain determinate pressue value, then also as schematically indicated in the figure the aforementioned valve element of said 2–3 shift valve 57 is positioned by the action of said pressure in said chamber 62 which overcomes the action of said spring to a second position in which its port "b" is isolated and is not connected by any other ports, while its input port "a" is connected to its port "c".

Thus, when the vehicle is running so that supply of the line pressure is being provided from the line pressure regulation valve 42 to the conduit 43 and thence via a branching off conduit 58 to the port "a" of the 2–3 shift valve 57: if the pressure chamber 62 of said 2–3 shift valve 57 is being supplied with a hydraulic fluid pressure less than said certain determinate pressure value, then the port "c" of said valve 57 is drained via the port "b" which is connected to a hydraulic drain, and accordingly and accordingly no substantial pressure at all is supplied to the pressure chamber 61 of the hydraulic actuator system 60 for the clutch C2 29, and therefore said clutch C2 29 is allowed to slip completely, and is substantially completely disengaged and does not transmit any substantial torque between the shaft 9 and the intermediate shaft 19 of the main gear transmission mechanism 10. And, when on the other hand the pressure chamber 62 of the 2–3 shift valve 57 is being supplied with a hydraulic fluid pressure greater than said certain determinate pressure value, then the port "a" of said valve 57 is communicated to the port "b" thereof, and thus substantially full line pressure is supplied to the pressure chamber 61 of the hydraulic actuator system 60 for the clutch C2 29, via the conduit 59, without substantial attenuaton. Thereby said clutch C2 29 is fully engaged and is able to transmit maximum torque between the shaft 9 and the intermediate shaft 19 of the main gear transmission mechanism 10, i.e. from the fluid torque converter assembly 2 to the second planetary gear mechanism 104, without substantial slippage.

The pressure chamber 62 of the 2–3 shift valve 57 is supplied with actuating hydraulic fluid pressure via the aforementioned conduit 64 from a port of an electromagnetic solenoid valve 63. This valve 63 is of a per se known type, and comprises a solenoid (not particularly shown) which is supplied with an ON/OFF electrical signal from the aforementioned electrical control system which will be described hereinafter. And the conduit 64 is also supplied via a throttling element 97 with line pressure from the conduit 43. The electromagnetic solenoid valve 63 is so constituted that: when said electromagnetic solenoid valve 63 is supplied with an OFF electrical signal, it connects the conduit 64 to drain substantially always, so that the pressure supplied to the pressure chamber 62 of the 2-3 shift valve 57 is very low or zero, and is certainly less than said certain determinate pressure value; but, when said electromagnetic solenoid valve 63 is supplied with an ON electrical signal, it does not connect the conduit 64 to drain at all, so that the pressure supplied to the pressure chamber 62 of the 2-3 shift valve 57 is substantially line pressure, i.e. is greater than said certain determinate pressure value.

Accordingly, if the electrical signal supplied to the electromagnetic solenoid valve 63 is ON, then substantially full line pressure is supplied to the pressure chamber 61 of the hydraulic actuator system 60 for the clutch C2 29, via the conduit 59, without substantial attenuation, and thereby said clutch C2 29 is fully engaged and is able to transmit maximum torque between the shaft 9 and the intermediate shaft 19 of the main gear transmission mechanism 10, without substantial slippage. When, however, the electrical signal supplied to the electromagnetic solenoid valve 63 is OFF, then no substantial pressure at all is supplied to the pressure chamber 61 of the hydraulic actuator system 60 for the clutch C2 29, and therefore said clutch C2 29 is allowed to slip completely, and is substantially completely disengaged and does not transmit any substantial torque between the shaft 9 and the intermediate shaft 19 of the main gear transmission mechanism 10.

In overall conrol of the automatic transmission there is provided a control system which in all these shown constructions incorporates a microcomputer 70, shown in FIG. 2 simply by a block; this block, and the term "microcomputer 70", in fact are intended to include not only the microprocessor which performs the computing processes which will be described shortly but also the various I/O interfaces such as D/A and A/D converters and so on associated with said microprocessor, as well as perhaps other functionally related means. This microcomputer 70 controls the engagement and disengagement of all of the hydraulic clutches and brakes detailed above, but only its role in engaging and disengaging the forward clutch Cl is relevant and will be discussed herein. The microcomputer 70 receives input signals from sensors, including: a throttle opening sensor 71, which senses the position of the throttle pedal (not particularly shown) of the internal combustion engine 100 of the vehicle, and which produces an output signal representative thereof, which is taken as representative of engine load; a road speed sensor 72, which produces an output signal representative of vehicle road speed (actually of the rotational speed of the power output shaft 8 of the gear transmission mechanism); a shift position switch 73, which is provided as appended to the manual range selection valve 42, and which produces an output signal representative of what speed range is currently set on said manual range selection 42; and the previously mentioned rotational speed sensor 75, which senses the rotational speed of the drum member 29a of the direct clutch C2 29 and produces an output signal representative thereof. (The element 74, shown by double dashed lines, relates to the second anti creep control system to be discussed, and will be described hereinafter with relation to FIG. 4). And the microcomputer 70 repeatedly executes a control program for setting the various clutches and brakes detailed above to be engaged or disengaged.

The First Anti Creep Control System and Method

The portion of said control program relating to the engagement and disengagement by supply of an actuating electrical pulse signal to the electromagnetic solenoid valve 55 of the forward clutch C1 28, and to the engagement and disengagement by supply of an actuating electrical ON/OFF signal to the electromagnetic solenoid valve 63 of the clutch C2 29, utilized in the first anti creep control system and method, will now be detailed with reference to FIG. 3 which is a flow chart of said relevant portion. This portion of the program is executed at regular intervals, or once every time the crank shaft of the engine 100 rotates through a determinate angle, and implements one version of the torque converter output shaft rotation rate detection system and method of the present invention.

First, in the step 100, a test is made as to whether or not a forward driving range, i.e. "D" or drive range, "S" or second range, or "L" or low range, is selected on the manual range setting valve 42. The microcomputer 70 makes this decision based upon the output of the shift position switch 73. If the result of this test is NO, i.e., the range currently selected is not one in which forward vehicle motion is possible, then the flow of control passes next to the decision step 112; but, if the result of this test is YES, so that forward driving is possible, then the flow of control passes next to the decision step 101.

Next, in this decision step 101, a test is made as to whether the vehicle road speed is currently less than a predetermined relatively small value, or not, i.e. as to whether the vehicle is currently substantially stopped, or not. The microcomputer 70 makes this decision based upon the output of the vehicle road speed sensor 72. If the result of this test is NO, i.e. the vehicle is not at this time substantially stationary, then as before the flow of control passes next to the step 112; but, if the result of this test is YES, so that the vehicle is currently stopped, then the flow of control passes next to the step 102.

Next, in this step 102, a test is made as to whether the throttle of the internal combustion engine 100 is currently substantially fully closed, or not, i.e. as to whether the load on said internal combustion engine 100 is currently substantially zero, or not. The microcomputer 70 makes this decision based upon the output of the throttle opening sensor 71. If the result of this test is NO, i.e. the engine throttle is not at this time substantially fully closed and the vehicle is not currently idling, then as before the flow of control passes next to the step 112; but, if the result of this test is YES, so that the engine load is currently substantially zero and the vehicle is currently idling, then the flow of control passes next to the step 103.

In this step 103, an ON electrical signal is sent by the microcomputer 70 to the electromagnetic solenoid valve 63, and as described above this causes the pressure supplied to the pressure chamber 62 of the 2-3 shift valve 57 to be equal substantially to line pressure, so that said 2-3 shift valve 57 supplies substantially full line pressure to the pressure chamber 61 of the hydraulic actuator system 60 for the clutch C2 29 via the conduit 59, so that thereby said clutch C2 29 is fully engaged and transmits maximum torque between the shaft 9 and the intermediate shaft 19 of the main gear transmission mechanism 10, thus causing said shafts 9 and 19 and also the drum member 29a of said clutch C2 29 to rotate together without substantial mutual slippage. In this operational condition the rotational speed of said drum member 29a, which as described above is the quantity whose rotational speed is measured by the rotational speed sensor 75, is exactly equal to the rotational speed of the shaft 9, i.e. is exactly equal to the rotational speed of the output member of the fluid torque converter assembly 2, i.e. of the turbine member 4 thereof. In this operational condition, even though the clutch C2 29 is engaged, since the brake B2 31 is not engaged, the reverse speed stage of the main gear transmission mechanism 10 is not engaged. When this clutch C2 29 and also the clutch C1 28 are engaged, the direct drive stage of the main gear transmission mechanism 10 is engaged, i.e. the fourth speed stage of the gear transmission mechanism as a whole is engaged; but actually this presents no substantial problem, because the driving force for the vehicle is according less than that which would be present if the first speed stage were engaged, and accordingly creep is reduced. Next, the flow of control passes next to the decision step 104.

In this decision step 104, a test is made as to whether the current value of a flag F1 is currently unity, or not. The flag F1, as will be seen later, is unit when and only when an electricl pulse signal of duty ratio equal to the second above defined determinate duty ratio value is already being supplied to the electromagnetic solenoid valve 55, so that anti creep action is already being provided with the forward clutch C1 28 already being operated with a reduced torque transmission capability. If the result of this test is YES, i.e. the duty ratio of the pulsed electrical signal currently being supplied to the electromagnetic solenoid valve 55 is already equal to the second above defined determinate duty ratio value and accordingly anti creep action is currently being performed, then the flow of control skips to pass next to the decision step 107; but, if the result of this test is NO, so that the duty ratio of the pulsed electrical signal currently being supplied to the electromagnetic solenoid valve 55 is not equal to the second above defined determinate duty ratio value and no anti creep is being currently provided, then the flow of control passes next to the decision step 105.

In this decision step 105, a test is made as to whether the current value of a flag F2 is currently unity, or not. The flag F2, as also will be seen later, is unity when and only when an electrical pulse signal of duty ratio equal to the third above defined determinate duty ratio value is being supplied to the electromagnetic solenoid valve 55, so that the forward clutch C1 28 is currently substantially completely disengaged. If the result of this test is YES, i.e.the duty ratio of the pulsed electrical signal currently being supplied to the electromagnetic solenoid valve 55 is already equal to the third above defined determinate duty ratio value and total disengagement of the forward clutch C1 28 is already currently being performed, then the flow of control skips to pass next to the step 107; but, if the result of this test is NO, so that the duty ratio of the pulsed electrical signal currently being supplied to the electromagnetic solenoid valve 55 is not yet equal to the third above defined determinate duty ratio value (or the second one thereof either) and the forward clutch C1 28 is not currently fully disengaged, then the flow of control passes next to the step 106.

In this step 106, an electrical pulse signal is supplied to the electromagnetic solenoid valve 55 of duty ratio substantially equal to the second above defined determinate duty ratio value, so that as explained above the forward clutch C1 28 is put into the condition of being operated with a reduced torque transmission capability and is held approximately at its slippage point, in other words so that anti creep action is performed. And then the flag F1 is set to unity, to indicate this condition, while the flag F2 is set to zero; and the flow of control passes next to the step 107. At this point the forward clutch C1 28 is held with a certain degree of slippage, just before the point of substantial torque transmission, and substantially no torque transmission thus is provided from the fluid torque converter assembly 2 to the front ring gear 22 (which is the rotational power input member to the gear transmission mechanism 7 for forward driving). Thereby, idling vibration is reduced, and the undesirable creeping forward effect of the vehicle while stationary is effectively prevented.

Next, in the decision step 107, a test is made as to whether the current value No of the rotational speed of the output member of the torque converter assembly 2, i.e. of the output shaft 9 and of the turbine member 4 of said torque converter assembly 2, is currently less than a determinate value Noset, or not. The value Noset is predetermined in view of the idling characteristics of the engine 100, and is typically set by experiment, or by reference to the turbine member rotational speed with the transmission in the "N" operational range condition and the vehicle stopped. This output rotational speed of said output shaft 9 and said turbine member 4 is determined by the micro computer 70 according to the output of the rotational speed sensor 75, i.e. according to the rotational speed of the drum member 29a of the clutch C2 29. When the rotational speed of the output member of the torque converter assembly 2 has fallen below Noset, then presumably this is due to the dragging of the forward clutch C1 28 causing drag load to act on the fluid torque converter assembly 2, and in this case the flow of control is transferred to pass next to the decision step 108; but, if the result of this test is NO, so that the rotational speed of the output member of the torque converter assembly 2 currently is above Noset, then in this case the flow of control passes next to the decision step 110.

In the step 108, a test is made as to whether the current value of the flag F2 is currently unity, or not. If the result of this test is YES, i.e. the duty ratio of the pulsed electrical signal currently being supplied to the electromagnetic solenoid valve 55 is already equal to the third above defined determinate duty ratio value and total disengagement of the forward clutch C1 28 is already currently being performed, then the flow of control skips to pass next to pass out of this anti creep routine, without doing anything further; but, if the result of this test is NO, so that the duty ratio of the pulsed electrical signal currently being supplied to the electromagnetic solenoid valve 55 is not yet equal to the third above defined determinate duty ratio value and the forward clutch C1 28 is not currently fully disengaged, then the flow of control passes next to the step 109. In this step 109, an electrical pulse signal is supplied to the electromagnetic solenoid valve 55 of duty ratio equal to the third above defined determinate duty ratio value, so that as explained above the forward clutch C1 28 is put into the condition of being substantially completely disengaged, in other words so that the rotational speed of the output shaft 101 of the engine 100 and the torque converter pump impeller 3, and also the speed of the torque converter turbine member 4 and the shaft 9, are allowed to rise. This avoids the drag problem which had caused unacceptably reduced engine rotational speed. And then the flag F1 is set to zero, while the flag F2 is set to unity, to indicate this condition; and the flow of control passes next to pass out of this anti creep routine, without doing anything further. Thereby, again, idling vibration is reduced.

On the other hand, in the step 110, likewise a test is made as to whether the current value of the flag F2 is currently unity, or not. If the result of this test is NO, i.e. the duty ratio of the pulsed electrical signal currently being supplied to the electromagnetic solenoid valve 55 is not now equal to the third above defined determinate duty ratio value and total disengagement of the forward clutch C1 28 is not at this time currently being performed, then the flow of control skips to pass out of this anti creep routine, without doing anything further; but, if the result of this test is YES, so that the duty ratio of the pulse electrical signal currently being supplied to the electromagnetic solenoid valve 55 is currently equal to the third above defined determinate duty ratio value and the forward clutch C1 28 is in fact currently substantially fully disengaged, then the flow of control passes next to the step 111. In this step 111, the flag F2 is set to zero, and the flow of control passes next out of this anti creep routine, without doing anything further. Thereby, when repeating this anti creep program portion, when the anti creep conditions persist, in other words when the manual range setting valve 42 is still set to a forward driving range, when the vehicle road speed is substantially zero, and when the throttle is fully closed, then the step 106 will be executed, and again the electrical pulse signal supplied to the electromagnetic solenoid valve 55 will be of duty ratio equal to the second above defined determinate duty ratio value, so that as explained above the forward clutch C1 28 will be put into the condition of being operated with a reduced torque transmission capability, in other words so that anti creep action is performed. Thus, the forward clutch C1 28 will be held with a certain degree of slippage, just before the point of substantial torque transmission, and substantially no torque transmission thus will be provided from the fluid torque converter assembly 2 to the front ring gear 22.

On the other hand, in the decision step 112, to which as explained above the flow of control is transferred when it is ascertained, in any one of the decision steps 100 through 102, that the conditions for applying anti creep action do not in fact currently hold, a test is made as to whether the current value of the flag F1 is currently unity, or not. If the result of this test is YES, i.e. the duty ratio of the pulsed electrical signal currently being supplied to the electromagnetic solenoid valve 55 is already equal to the second above defined determinate duty ratio value and anti creep action is not currently to be performed, then the flow of control skips to pass next to the step 114; but, if the result of this test is NO, so that the duty ratio of the pulsed electrical signal currently being supplied to the electromagnetic solenoid valve 55 is not equal to the second above defined determinate duty ratio value, then the flow of control passes next to the decision step 113. In this next decision step 113, a test is made as to whether the current value of the flag F2 is currently unity, or not. If the result of this test is YES, i.e. the duty ratio of the pulsed electrical signal currently being supplied to the electromagnetic solenoid valve 55 is currently equal to the third above defined determinate duty ratio value and total disengagement of the forward clutch C1 28 is currently being performed, while on the other hand it is not desired to perform anti creep action at this time, then the flow of control similarly skips to pass next to the step 114; but, if the result of this test is NO, so that the duty ratio of the pulsed electrical signal currently being supplied to the electromagnetic solenoid valve 55 is not equal to the second or the third above defined determinate duty ratio value, and therefore must already be currently equal to the first above defined duty ratio value, then the flow of control passes next to exit this anti creep routine without doing anything further.

On the other hand, in the step 114, an OFF electrical signal is sent by the microcomputer 70 to the electromagnetic solenoid valve 63, and as described above this causes the pressure supplied to the pressure chamber 62 of the 2-3 shift valve 57 to be equal substantially to zero, so that said 2-3 shift valve 57 supplies substantially no pressure to the pressure chamber 61 of the hydraulic actuator system 60 for the clutch C2 29 via the conduit 59, so that thereby said clutch C2 29 is substantially fully disengaged and transmits substantially no torque between the shaft 9 and the intermediate shaft 19 of the main gear transmission mechanism 10, thus causing said shafts 9 and 19 and also the drum member 29a of said clutch C2 29 to be mutually disengaged. And then control passes next to the step 115.

In this step 115, an electrical pulse signal is supplied to the electromagnetic solenoid valve 55 of duty ratio equal to the first above defined determinate duty ratio value, so that as explained above the forward clutch C1 28 is now put into the condition of being substantially completely and firmly engaged, if of course the manual range selection valve 42 is currently set to a forward driving range. Thus, a normal first or forward speed stage of the gear transmission mechanism 7 is made available. And then the flag F1 is set to zero, while the flag F2 is similarly set to zero, thereby to indicate this condition; and then the flow of control passes next out of this anti creep routine, without doing anything further.

According to the above described idling control method and system and according to this torque converter output member rotational speed sensing method and system according to this preferred embodiment of the present invention, it is seen that the engine idling control is performed by monitoring a rotational speed associated with the fluid torque converter assembly, so that it is ensured that no torque is transmitted through the forward clutch C1 28, while at the same time the forward clutch actuating pressure is held as high as possible consistent with such a condition. Thus, the actuating pressure for the forward clutch C1 28 is kept relatively high-indeed, as high as practicable for any particular engine operational conditions—and thereby as fast a take up of clutch engagement as possible is made available. Accordingly, a good anti creep action is made available, and the automatic transmission is ensured of a good starting off feeling, while still no particularly hard brake application by the vehicle driver is required during the vehicle stationary engine idling condition, in order to prevent the vehicle moving off from rest when it is not desired for it to do so. Thus, this idling control system for an automatic transmission keeps engine fuel economy high, and helps to prevent engine overheating, as well as helping to prevent engine idling vibration. Further, because of the adaptive nature of this idling control system, variations in performance characteristics of the automatic transmission due to alterations in operational conditions are compensated for, as also are manufacturing variations. Accordingly, this idling control system has good producability in practice.

And, particularly according to the concept of the present invention, since the rotational speed associated with the fluid torque converter assembly which is measured is the rotational speed of the output member of said torque converter assembly, which is measured by measuring the rotational speed of the drum member 29a of the clutch C2 29, it is seen that there are provided a method and device for detecting the rotational speed of the output shaft of a fluid torque converter, which can be applied even to a transmission in which no overdrive device is provided, or to a transmission such as this one in which the overdrive device is provided on the other side of a main transmission mechanism thereof from said torque converter. And this method for detecting the rotational speed of the output shaft of a fluid torque converter does not entail making the construction of the transmission very much larger or bulkier than otherwise required, and allows anti creep action to be conveniently provided, thus to keep engine fuel economy high and to prevent engine overheating, engine idling vibration, and engine snatch.

THE SECOND ANTI CREEP CONTROL SYSTEM AND METHOD

Figure 3:
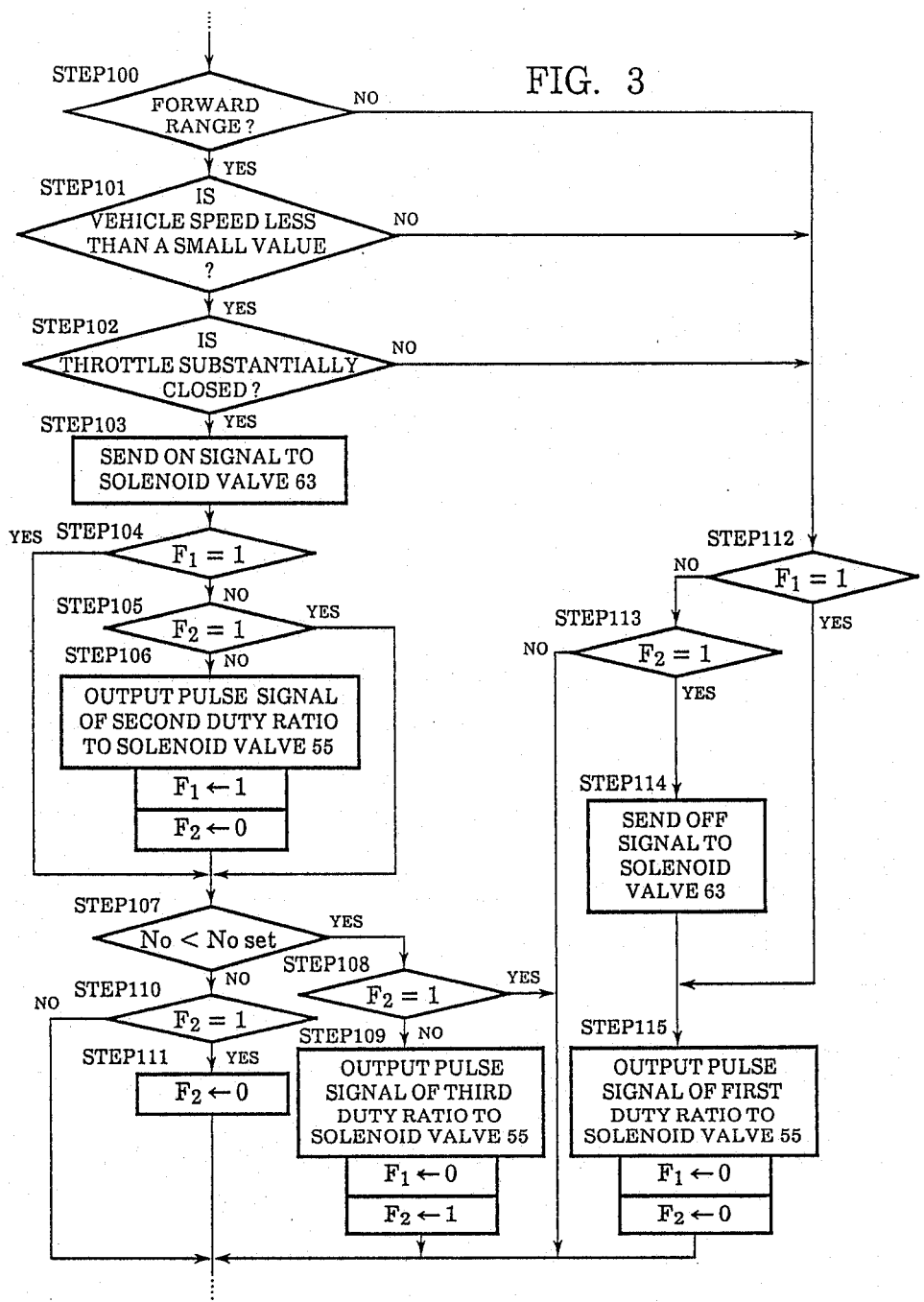
FIG. 3 is a flow chart for a portion of a program executed by a microprocessor incorporated in the first said anti creep control system which cooperates with the first preferred embodiment of the torque converter output shaft rotation rate detection system of the present invention which functions so as to perform the first method embodiment.
Figure 4:
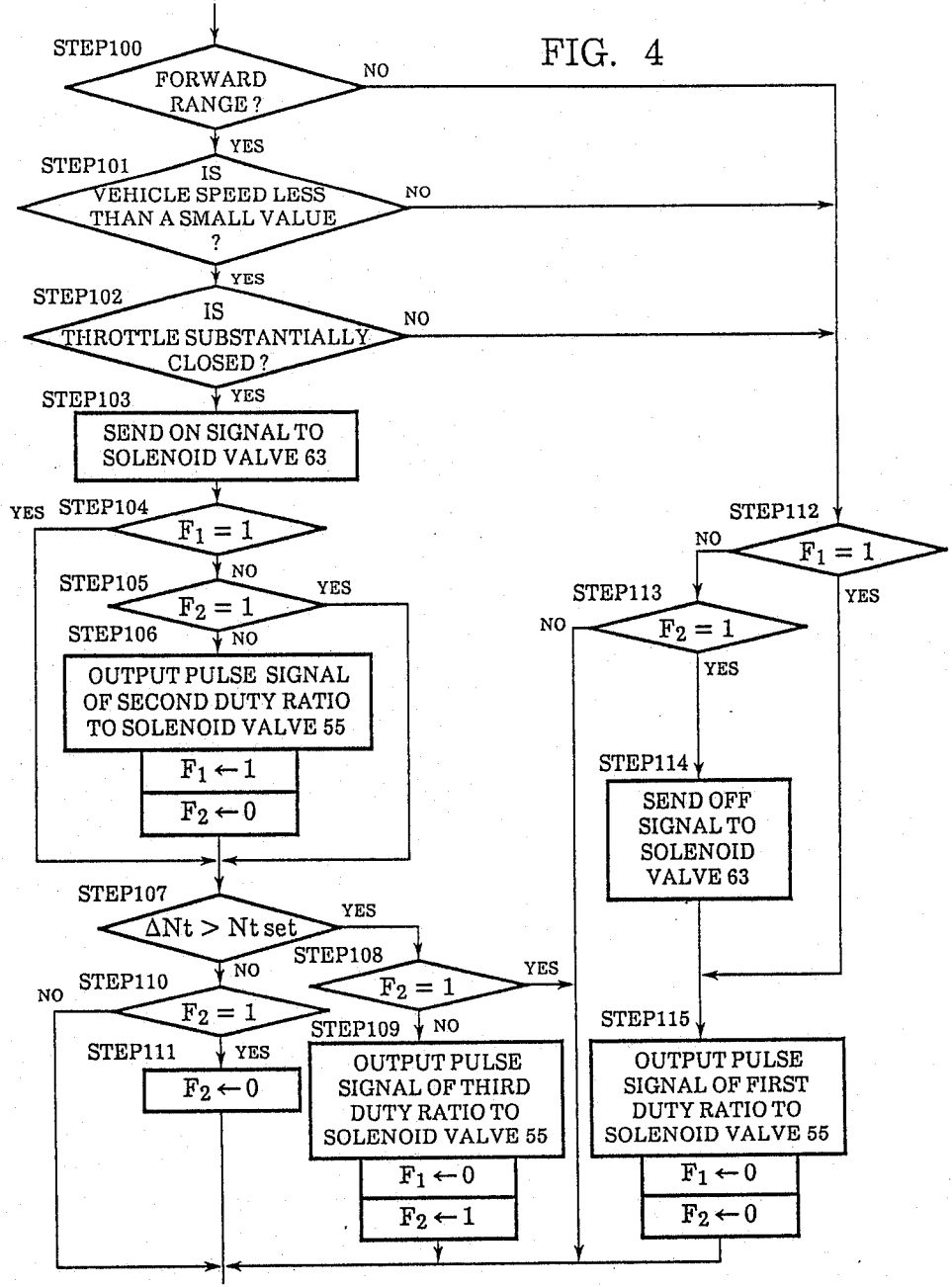
FIG. 4 is similar to FIG. 3 for the first preferred embodiments, being a flow chart for a similar portion of a program executed by a microprocessor incorporated in the second said anti creep control system.

The portion of the control program relating to the engagement and disengagement by supply of an actuating electrical pulse signal to the electromagnetic solenoid valve 55 of the forward clutch C1 28, and to the engagement and disengagement by supply of an actuating electrical ON/OFF signal to the electromagnetic solenoid valve 63 of the clutch C2 29, utilized in the second anti creep control system and method to be described, will not be particularly detailed herein, since most of the details thereof will be understood by one of ordinary skill in the art based upon the disclosures above and based upon the flow chart of said relevant portion shown in FIG. 4. This portion of the program is again executed at regular intervals, or once every time the crank shaft of the engine 100 rotates through a determinate angle, and implements another version of the torque converter output shaft rotation rate detection system and method of the present invention. In this FIG. 4 flow chart, steps which correspond to steps analogous to ones of the flow chart of FIG. 3 are denoted by reference numerals like to those utilized for said analogous steps in FIG. 3.

The difference in this second application is that, instead of basing the decision as to whether or not to perform anti creep action upon the absolute value of the rotational speed of the output member of the fluid torque converter assembly, instead said decision is based upon the difference $\Delta Nt$ between the rotational speed of the input member of the fluid torque converter assembly, i.e. of the rotational speed of the internal combustion engine 100, and the rotational speed of the output member of said fluid torque converter assembly. The rotational speed of the internal combustion engine 100 is determined by the micro computer 70 based on the output of a sensor 74 therefor (see FIG. 2 wherein said sensor 74 is shown only by dashed lines), while as in the above first application of the present invention the rotational speed of the output member of the fluid torque converter assembly is determined by measuring the rotational speed of the drum member 29a of the clutch C2 29 by the use of the sensor 75. And, in this case, control is performed so that the value of $\Delta Nt$ does not increase above a preset value Ntset. Details will be easily supplemented by one of ordinary skill in the art, based upon the above explanations. And the same advantages and benefits are obtained as in the case of the first application described above.

THE THIRD ANTI CREEP CONTROL SYSTEM AND METHOD

Figure 5:
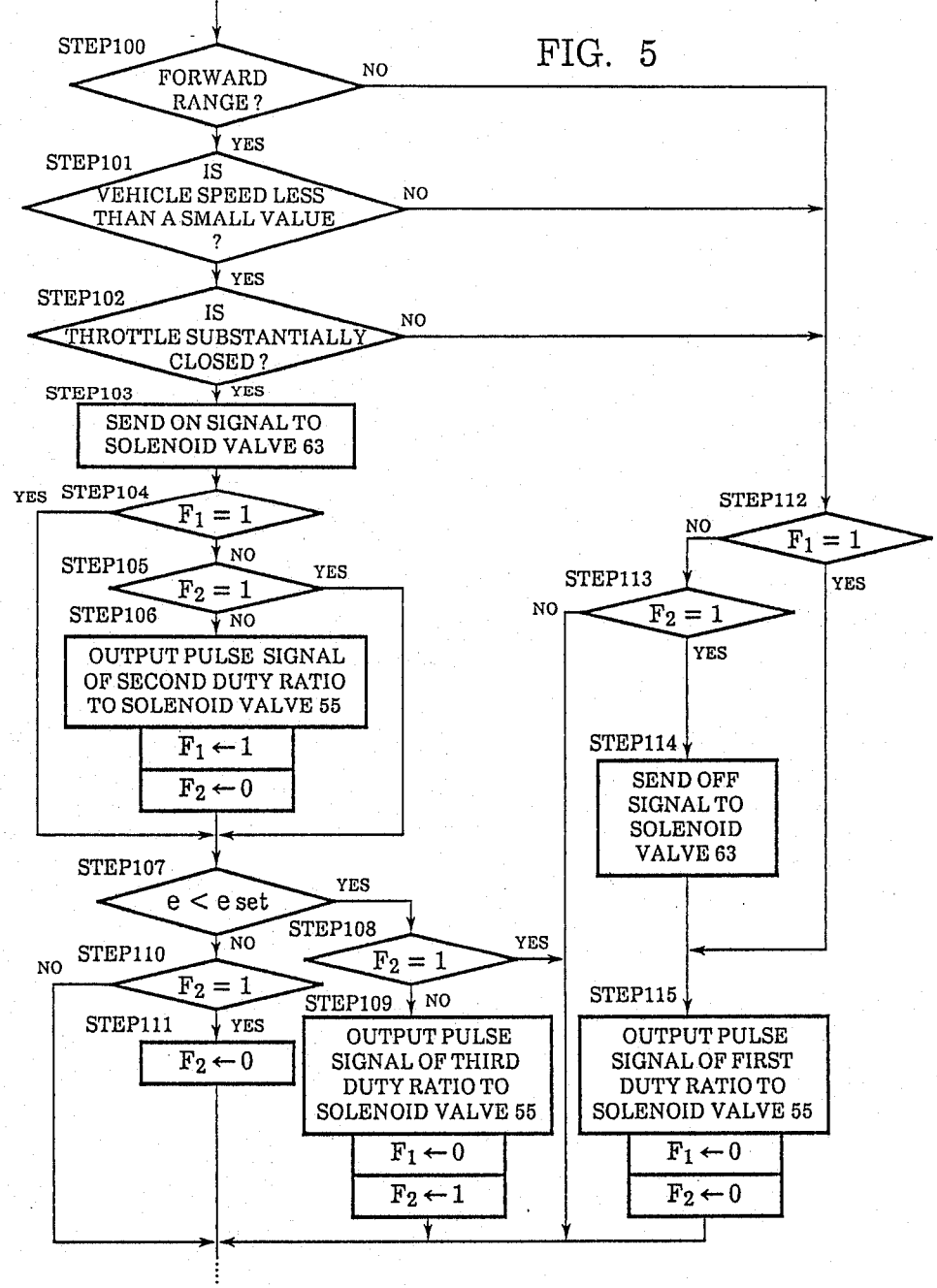
FIG. 5 is similar to FIGS. 3 and 4, being a flow chart for a similar portion of a program executed by a microprocessor incorporated in the third said anti creep control system.

The portion of the control program relating to the engagement and disengagement by supply of an actuating electrical pulse signal to the electromagnetic solenoid valve 55 of the forward cluth C1 28, and to the engagement and disengagement by supply of an actuating electrical ON/OFF signal to the electromagnetic solenoid valve 63 of the clutch C2 29, utilized in the third anti creep control system and method to be described, again will not be particularly detailed herein, since again most of the details thereof will be understood by one of ordinary skill in the art based upon the disclosures above and based upon the flow chart of said relevant portion shown in FIG. 5. This portion of the program is again executed at regular intervals, or once every time the crank shaft of the engine 100 rotates through a determinate angle, and implements another version of the torque converter output shaft rotation rate detection system and method of the present invention. In this FIG. 5 flow chart, steps which correspond to steps analogous to ones of the flow chart of FIGS. 3 and 4 are again denoted by reference numerals like to those utilized for said analogous steps in FIGS. 3 and 4.

The difference in this third application is that, instead of basing the decision as to whether or not to perform anti creep action upon the absolute value of the rotational speed of the output member of the fluid torque converter assembly, or upon the difference between said input member rotational speed and the fluid torque converter assembly output member rotational speed, said anti creep decision is instead performed based upon the ratio between said fluid torque converter assembly output member rotational speed and its input member rotational speed. The rotational speed of the internal combustion engine 100, i.e. the torque converter assembly input member rotational speed, is again determined by the micro computer 70 based upon the output of the sensor 74 therefor, while as in the above first and second applications of the present invention the rotational speed of the output member of the fluid torque converter assembly is determined by measuring the rotational speed of the drum member 29a of the clutch C2 29 by the use of the sensor 75. And, in this case, control is performed so that the value of the ratio e of the output member rotational speed to the input member rotational speed does not drop below a preset value eset. Details will again be easily supplemented by one of ordinary skill in the art, based upon the above explanations. And the same advantages and benefits are obtained as in the case of the first and second applications described above.

Overall Transmission Structure for Another Set of Preferred Embodiments

Figure 6:
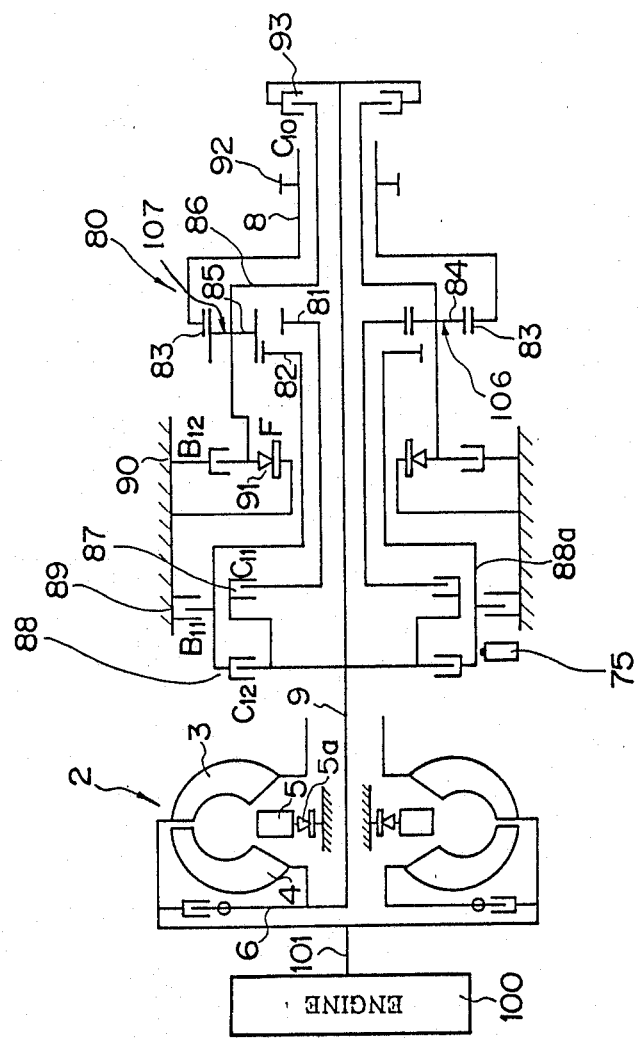
FIG. 6, similarly to FIG. 1, is a schematic skeleton diagram, showing the overall layout of the components of another automatic transmission to which other preferred embodiments of the torque converter output shaft rotation rate detection system and method of the present invention are applied.

FIG. 6 is a schematic skeleton diagram showing the overall layout of the components of an automatic transmission to which another set of preferred embodiments of the output shaft rotation rate detection system and method of the present invention can be exemplarily applied. Parts of this automatic transmission which correspond to parts of the transmission shown in FIG. 1 are denoted by the same reference numerals. In this figure, the automatic transmission is again shown as being powered by an internal combustion engine 100 via a shaft 101 which may be a continuation of the crank shaft of said engine 100, and as transmitting output rotational power to a sleeve shaft 8 and via a gear or sprocket wheel 92 which transmits power, although this is not particularly indicated in the figures, to a differential device for powering the driven wheels of the automotive vehicle to which this automatic transmission and this internal combustion engine 100 are fitted.

In more detail, the automatic transmission 1 comprises a fluid torque converter assembly 2 and a gear transmission mechanism 80. The fluid torque converter assembly 2 is supplied with rotational power via the aforementioned power output shaft 101 of the internal combustion engine 100, which thus functions as a power input shaft for said fluid torque converter assembly 2; and a shaft 9 functions as a power output shaft for said fluid torque converter assembly 2 and also as a power input shaft for the gear transmission mechanism 80 and transmits rotational power therebetween. The fluid torque converter assembly 2 is of substantially the same type as before, and accordingly will not be further discussed in the interests of conciseness of description.

In further detail, the gear transmission mechanism 80 comprises coaxially provided sun gears 81 and 82, which are hollow and are arranged on the outside of the aforementioned power input shaft 9 of this gear transmission mechanism 80, with the sun gear 82 on the outside of the sun gear 81. A first planetary gear mechanism 106 comprises the sun gear 81, a coaxially provided ring gear 83, and a carrier 86 which rotatably supports a plurality of planetary pinions 84 which are meshed with outer teeth formed on the sun gear 81 and with inner teeth formed on the ring gear 83 and which perform planetary motion between said sun gear 81 and said ring gear 83 in a per se conventional manner. And a second planetary gear mechanism 107 comprises the sun gear 82, the same coaxially provided ring gear 83, and the same carrier 86 which rotatably supports another plurality of planetary pinions 85 which are meshed with outer teeth formed on the sun gear 82 and with said inner teeth formed on the ring gear 83 and perform planetary motion between said sun gear 82 and said ring gear 83 in a per se conventional manner. A clutch C11 87 is provided for selectively, when operated by selective and appropriate supply of actuating hydraulic fluid pressure thereto, rotationally connecting the sun gear 81, which constitutes one rotational power input member for this gear transmission mechanism 80, to the power input shaft 9 with respect to mutual rotation therebetween in both rotational directions. And a clutch C12 88 is provided for selectively, when operated by selective supply of actuating hydraulic fluid pressure thereto, rotationally connecting said power input shaft 9 to the sun gear 82, which constitutes another rotational power input member for this gear transmission mechanism 80, again with respect to mutual rotation therebetween in both rotational directions. The ring gear 83 is rotationally connected to the power output shaft 8 and to the power output gear wheel 92 of this gear transmission mechanism 80. A brake B11 89 is provided for selectively, when operated by selective supply of actuating hydraulic fluid pressure thereto, rotationally connecting the sun gear 82 to the casing of this gear transmission mechanism 80 with respect to mutual rotation therebetween in both rotational directions. And a brake B12 90 is provided for selectively, when operated by selective supply of actuating hydraulic fluid pressure thereto, rotationally connecting the carrier 86 for the planetary pinions 84 and 85 to said casing of this gear transmission mechanism 80 with respect to mutual rotation therebetween in both rotational directions. Also, a one way clutch F 91 is provided for always rotationally connecting said carrier 86 for said planetary pinions 84 and 85 to said casing of this gear transmission mechanism 80 with respect to mutual rotation therebetween in one rotational direction only, and a clutch C10 93 is provided for selectively, when operated by selective supply of actuating hydraulic fluid pressure thereto, rotationally connecting together the carrier 86 and the power input shaft 9 of the gear transmission mechanism 80 with respect to mutual rotation therebetween in both rotational directions. The clutches C11, C12, and C10 and the brakes B11 and B12 again are per se conventional types of friction engaging mechanisms comprising per se conventional hydraulic actuator systems, and are engaged when hydraulic fluid pressure is supplied to their pressure chambers (not particularly shown), while they are disengaged when no hydraulic fluid pressure is supplied to their said pressure chambers. And, particularly according to the concept of the present invention, a rotational speed sensor 75 is provided for detecting the current value of the rotational speed of the clutch drum 88a of the direct clutch C12 88, i.e. of the driven member of the clutch C12 88, which is integrally connected with and rotates along with the sun gear 82.

Thus, the gear transmission mechanism 80, according to selective engagement and disengagement of the clutches C10 93, C11 87, and C12 88 and of the brakes B11 89 and B12 90, can be controlled to provide any one of four forward gearing ratios or rotational speed stages including an overdrive speed stage and one reverse gearing ratio or rotational speed stage between its power input shaft 9 and its power output shaft 8, as particularly detailed in Table 2 which for convenience of pagination is given at the end of the specification and before the Claims of the present patent application. In this Table 2, as in the Table 1, an "O" in a column relating to a hydraulic clutch or a hydraulic brake indicates that said hydraulic clutch or hydraulic brake is engaged, while an "X" relating to such a hydraulic clutch or hydraulic brake indicates that said hydraulic clutch or hydraulic brake is disengaged; and an "O" in a column relating to a one way clutch indicates that said one way clutch is engaged so as to transmit rotational power when the internal combustion engine 100 is powering the driven wheels (not particularly shown) of the vehicle via the automatic transmission system 1 and on the other hand is free wheeling or disengaged when said engine 100 is not so driving said driven wheels of the vehicle, in other words indicates that said clutch is free wheeling in, and only in, the engine overrun condition; while an "F" relating to a one way clutch indicates that said one way clutch is free wheeling or disengaged. From this Table 2, it will be understood that: when the automatic transmission 1 is being operated in the drive or "D" range, all four of its forward speed stages including its overdrive speed stage are available to be utilized, according to vehicle operational conditions; but, however, when the automatic transmission 1 is being operated in the second or "S" range, no upshift from the third speed stage to the fourth speed stage is ever performed, and only the first through the third speed stages are available to be utilized; and further, when the automatic transmission 1 is being operated in the low or "L" range, no upshift from the second speed stage to the third or the fourth speed stage is ever performed, and only the first and the second speed stages are available to be utilized. And further it will be particularly noted from this Table that the hydraulic clutch C11 87 is engaged when, and only when, the gear transmission mechanism 80 is engaged to a forward speed stage (i.e., to the first, second, third, or fourth speed stage), and is otherwise disengaged.

With this transmission construction also, the same type of control as performed by the FIG. 2 control system, according to any of the anti creep control methods exemplarily illustrated by the flow charts given above and explained with respect to FIGS. 3 through 5, can be performed. As in those above described anti creep control systems, according to the concept of the present invention, the rotational speed of the output member of the fluid torque converter assembly 2 can be detected, during performance of anti creep control, by engaging the clutch C12 88, and by sensing the rotational speed of the drum member 88a of this clutch C12 88, which is its driven member. Thus, as before, according to the present invention, it is seen that there are provided a method and device for detecting the rotational speed of the output shaft of a fluid torque converter, which can be applied even to a transmission such as this one, in which no overdrive device is provided. And, as before, this method for detecting the rotational speed of the output shaft of a fluid torque converter does not entail making the construction of the transmission very much larger or bulkier than otherwise required, and allows anti creep action to be conveniently provided, thus to keep engine fuel economy high and to prevent engine overheating, engine idling vibration, and engine snatch.

Although the present invention has been shown and described in terms of the preferred embodiments of the method and of the system thereof, and with reference to the appended drawings, it should not be considered as being particularly limited thereby, since the details of any particular embodiment, or of the drawings, could be varied without, in many cases, departing from the ambit of the present invention. Accordingly, the scope of the present invention is to be considered as being delimited, not by any particular perhaps entirely fortuitous details of the disclosed preferred embodiments, or of the drawings, but solely by the scope of the accompanying claims, which follow after the Tables.

TABLE 1

|  |  | C1 28 | C2 29 | C0 17 | B1 30 | B2 31 | B0 18 | F1 32 | F0 16 |
|---|---|---|---|---|---|---|---|---|---|
| "P" RANGE |  | X | X | O | X | X | X | F | F |
| "R" RANGE |  | X | O | O | X | O | X | F | F |
| "N" RANGE |  | X | X | O | X | X | X | F | F |
| "D" RANGE | 1ST | O | X | O | X | X | X | O | O |
|  | 2ND | O | X | X | X | X | O | O | F |

TABLE 1-continued

|  |  | C1 28 | C2 29 | C0 17 | B1 30 | B2 31 | B0 18 | F1 32 | F0 16 |
|---|---|---|---|---|---|---|---|---|---|
|  | 3RD | O | X | O | O | X | X | F | O |
|  | 4TH | O | O | O | X | X | X | F | O |
|  | 5TH | O | O | X | X | X | O | F | F |
| "S" RANGE | 1ST | O | X | O | X | X | X | O | O |
|  | 2ND | O | X | X | X | O | O | O | F |
|  | 3RD | O | X | O | O | X | X | F | O |
| "L" RANGE | 1ST | O | X | O | X | O | X | O | O |
|  | 2ND | O | X | X | X | O | O | O | F |

TABLE 2

|  |  | C11 87 | C12 88 | C10 93 | B11 89 | B12 90 | F 91 |
|---|---|---|---|---|---|---|---|
| "P" RANGE |  | X | X | X | X | X | F |
| "R" RANGE |  | X | O | X | X | O | F |
| "N" RANGE |  | X | X | X | X | X | F |
| "D" RANGE | 1ST | O | X | X | X | X | O |
|  | 2ND | O | X | X | O | X | F |
|  | 3RD | O | O | O | X | X | F |
|  | 4TH | X | X | O | O | X | F |
| "S" RANGE | 1ST | O | X | X | X | X | O |
|  | 2ND | O | X | X | O | X | F |
| "L" RANGE | 1ST | O | X | X | X | O | F |

What is claimed is:

1. An automatic transmission for a vehicle equipped with an engine, comprising:

a torque converter having a rotational power input member adapted to be driven by said engine and a rotational power output member;

a gear transmission mechanism for selectively providing a plurality of speed stages including a first and lower speed stage, a second and substantially high speed stage, and a reverse stage, said gear transmission mechanism comprising a first rotational power input member, a second rotational power input member, a first clutch for selectively connecting, when engaged, said first rotational input member thereof with said rotational power output member of said torque converter, and a second clutch for selectively connecting, when engaged, said second rotational power input member thereof with said rotational power output member of said torque converter, said gear transmission mechanism providing said first speed stage when said first clutch is engaged with said second clutch being disengaged and providing said second speed stage or said reverse stage when said second clutch is engaged;

an oil pressure control system for selectively supplying an oil pressure to said first and second clutches for selectively engaging said first and second clutches, said oil pressure control system including an oil pressure and modification means for selectively modifying the pressure of the oil supplied to said first clutch to be lowered from a full pressure thereof to a medium pressure which partially engages said first clutch;

a speed sensor for detecting the rotational speed of said second rotational input member of said gear transmission mechanism; and a creep control system including means for detecting a certain vehicle operating condition that the vehicle is substantially at stoppage with the engine being in idling condition while said first clutch is supplied with the oil pressure, said creep control system, when said certain vehicle operating condition is being detected, partially overriding said oil pressure control system so as to engage said second clutch while controlling said oil pressure modification means so as to modify the oil pressure supplied to said first clutch so as to maintain a predetermined condition for the rotational speed of said rotational power output member of said torque converter, said rotational speed of said rotational power output member of said torque converter being detected by said speed sensor.

2. An automatic transmission according to claim 1, wherein said predetermined condition for the rotational speed of said rotational power output member of said torque converter is that the rotational speed of said rotational power output member of said torque converter is at a predetermined speed.

3. An automatic transmission according to claim 1, wherein said predetermined condition for the rotational speed of said rotational power output member of said torque converter is that the balance of the rotational speed of said rotational power output member of said torque converter relative to the rotational speed of said rotational power input member of said torque converter is at a predetermined value.

4. An automatic transmission according to claim 1, wherein said predetermined condition for the rotational speed of said rotational power output member of said torque converter is that the ratio of the rotational speed of said rotational power output member of said torque converter relative to the rotational speed of said rotational power input member of said torque converter is at a predetermined value.

* * * * *